(12) United States Patent
Sachs et al.

(10) Patent No.: US 11,980,940 B2
(45) Date of Patent: May 14, 2024

(54) CONTROLLED ENVIRONMENT FOR ADDITIVE MANUFACTURING

(71) Applicant: Desktop Metal, Inc., Burlington, MA (US)

(72) Inventors: Emanuel Michael Sachs, Newtown, MA (US); Julian Bell, Jamaica Plain, MA (US); Nicholas Graham Bandiera, Burlington, MA (US)

(73) Assignee: Desktop Metal, Inc., Burlington, MA (US)

( * ) Notice: Subject to any disclaimer, the term of this patent is extended or adjusted under 35 U.S.C. 154(b) by 340 days.

(21) Appl. No.: 17/438,439

(22) PCT Filed: Mar. 20, 2020

(86) PCT No.: PCT/US2020/023974
§ 371 (c)(1),
(2) Date: Sep. 12, 2021

(87) PCT Pub. No.: WO2020/198050
PCT Pub. Date: Oct. 1, 2020

(65) Prior Publication Data
US 2022/0152706 A1 May 19, 2022

Related U.S. Application Data

(60) Provisional application No. 62/822,285, filed on Mar. 22, 2019.

(51) Int. Cl.
B33Y 10/00 (2015.01)
B22D 23/00 (2006.01)
B22F 10/22 (2021.01)
B22F 12/70 (2021.01)
B33Y 30/00 (2015.01)
B33Y 40/00 (2020.01)

(52) U.S. Cl.
CPC ............ *B22F 12/70* (2021.01); *B22D 23/003* (2013.01); *B22F 10/22* (2021.01); *B33Y 10/00* (2014.12); *B33Y 30/00* (2014.12); *B33Y 40/00* (2014.12)

(58) Field of Classification Search
CPC ................................ B33Y 30/00; B33Y 10/00
See application file for complete search history.

(56) References Cited

U.S. PATENT DOCUMENTS

2018/0001556 A1* 1/2018 Buller .................... B29C 64/371
2018/0244034 A1* 8/2018 Sutcliffe ................ B29C 64/255

FOREIGN PATENT DOCUMENTS

WO WO-2015151840 A1 * 10/2015 .............. B22F 10/00
WO WO-2019009908 A1 * 1/2019 ........... B29C 64/153

* cited by examiner

Primary Examiner — Kevin E Yoon
(74) Attorney, Agent, or Firm — Oak Law, PLLC; Jonathan D. Hall

(57) ABSTRACT

A controlled environment system for the additive manufacture of metal objects using magnetohydrodynamic jetting. A sealing plate is placed against an Péclet gap seal of a volume enclosure. A flow of inert gas is used to maintain a high-purity volume in the interior of the volume enclosure. A print head accesses the interior and delivers build material through a hole in the sealing plate. A build plate is movable relative to the sealing plate within the interior of the volume enclosure on which objects can be fabricated.

24 Claims, 15 Drawing Sheets

CONTROLLED ENVIRONMENT FOR ADDITIVE MANUFACTURING

FIELD OF THE DISCLOSURE

The subject matter of the present disclosure generally relates to controlling environmental conditions, and more particularly relates to a controlled environment for the additive manufacture of metal objects using magnetohydrodynamic printing.

BACKGROUND OF THE DISCLOSURE

In many additive manufacturing and 3D Printing applications, including additive manufacturing of metals, it is critical to control aspects of the environment in which the part is being created. In many cases, it may be advantageous or critical to maintain a specific gas atmosphere. For example, when working with certain metal powders in additive manufacturing applications, it is critical to maintain an inert atmosphere with low partial pressures of contaminating gasses that could react with the print, to both improve the quality of the printed product by avoiding the creation of undesirable species such as oxides, carbides, hydrides, intermetallics or the like, and to reduce powder explosion hazards. The level of required purity varies by application but may be as low as single parts-per-million (PPM) contamination levels or lower for some processes. In many cases, it may be advantageous to control the temperature of the part being created by controlling the temperature and heat fluxes in the environment around the part.

In one technology of interest, controlled magnetohydrodynamic pulsing may be used to selectively jet individual drops of molten metals and additively build up three-dimensional geometries, in a process known as magnetohydrodynamic printing (here referred to as MHD printing, or MHD). In one embodiment of this process, a jetting apparatus (here referred to as the nozzle) is employed to heat solid metal feedstock above its liquidus temperature to create molten metal; contain the molten metal; keep the molten metal above its liquidus temperature; position the body of molten metal relative to a magnetic field; enable an electric current to be passed through the molten metal to create a magnetohydrodynamic pulse; and direct the flow of molten metal towards a desired target.

In additive manufacturing by MHD printing, both control of the gas atmosphere around the part and control of the temperature of the part are advantageous. For example, when printing a part out of an aluminum alloy, reducing or eliminating oxygen and water vapor from the environment of the part, from the environment of the MHD printhead, and from the environment that the molten drops traverse is found to be advantageous. This may be accomplished, for example, by maintaining an atmosphere of substantially pure argon. In MHD printing of aluminum, it has also been found to be advantageous to maintain the part at an elevated temperature in order to provide for proper fusion of newly printed molten droplets into the part. This can be accomplished by controlling the temperature of the gas environment to which the part is exposed, and other aspects of the environment, including aspects relevant to radiant heat transfer.

However, the production and maintenance of an inert atmosphere can be challenging. The production and maintenance of an environment with good temperature control can also be challenging. Initial purification of a given sealed volume may require that very large volumes of gas be used to displace contaminants by purging and/or that the volume be designed to allow vacuum to be pulled on the volume to remove contaminants. Furthermore, many materials commonly used in engineered systems, such as polymers, insulations, anodized coatings, and many others, may have high porosity, high surface areas, and can have adsorbed contaminants such as water vapor, oxygen, and other gases which are then released into the environment as the environment is purified and the concentration gradient becomes steeper.

Finally, many common mechanical components, such as recirculating ball bearing slides or motor windings, contain tortuous internal pathways which hold gas and can act as "virtual leaks" inside a pure environment. All of these sources of impurities become more problematic in a sealed volume which must be opened with some frequency, as each time the system is opened to atmosphere, water and oxygen can be re-adsorbed on surfaces and re-introduced to partially enclosed "virtual leaks". Typically, 3D Printing systems must be opened for user access to facilitate part removal or routine maintenance, for example. One approach would be to maintain the purity of the sealed volume via recirculating the atmosphere via blower and purifying via a molecular sieve or the like, as is common in gloveboxes. Molecular sieves have finite adsorption capacity and must be periodically regenerated via specific heating steps combined with flow of a reducing atmosphere, such as forming gas in order to reset their ability to remove contaminants. During regeneration, which may take many hours, the system is offline, effectively precluding the use of the 3D Printing system. Most often, these systems are paired with sensitive and expensive water vapor and oxygen sensors which continuously sample the atmosphere in order to monitor the health of the molecular sieve. In such an architecture, the user may access the necessary functions by way of vacuum-pumped load-locks or other engineering measures. Furthermore, it may necessitate the use of permeable elastomeric gloves which add substantially to the ingress of contaminants into the sealed volume. These systems have added complexities, cost and consumables as contrasted to the disclosure herein. In general, the challenges associated with maintaining a clean environment generally get more severe as the volume that needs to be controlled increases.

Similarly, there are challenges associated with maintaining elevated part temperatures while printing. As with maintaining clean environments, many of the mechanical components required to create motion cannot tolerate the elevated temperatures contemplated herein or would suffer degraded performance due to de-rating, thermal expansion, reduced service life or other considerations. Engineering solutions such as active cooling, water-cooling, or insulating sensitive components adds cost and complexity to a 3D printing system. Many components cannot easily operate in hot environments and would preferably be located in a colder region of the system. Additionally, as with maintaining clean environments, the issues associated with heated environments get more severe as the volume of the environment increases.

SUMMARY

Disclosed is controlled environment system which maintains favorable high purity inert conditions for objects being additively manufactured. An enclosure has an outer platform having a Péclet gap seal that is disposed against a sealing plate. A flow of gas outward from the enclosure's interior is used to seal the enclosure while permitting movement of the enclosure relative to the sealing plate. An additive manufacturing system, such as a jetting nozzle, may protrude through an opening in the sealing plate to deposit build material on a build plate to form objects within the enclosure.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

DETAILED DESCRIPTION

Figure 1A:
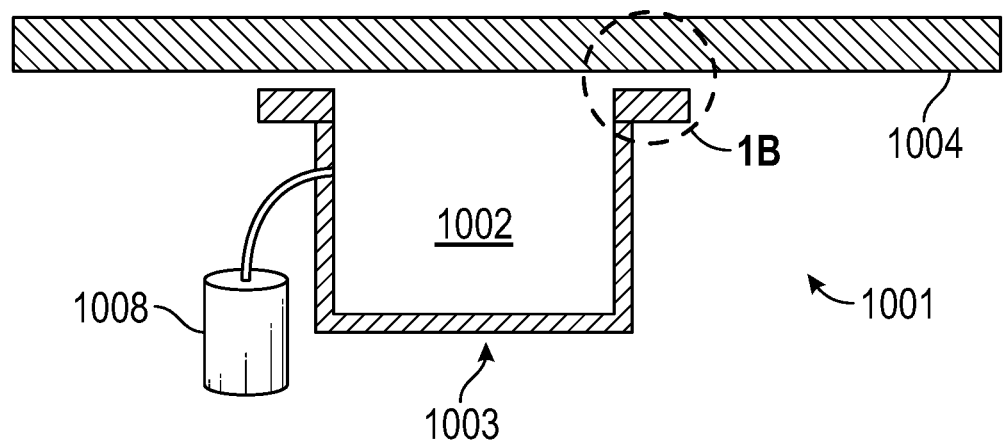
FIG. 1A-1B shows schematically the sealed volume and details of the Péclet gap sealing principle on a planar surface.

Disclosed is a controlled environment for use with the additive manufacture of objects using magnetohydrodynamic (MHD) jetting, though one of ordinary skill in the art will appreciate that the controlled environment may be employed with other additive manufacturing techniques.

One aspect of the present disclosure for facilitating the production of an inert environment and/or a heated environment is to remove as much equipment from the sealed volume as possible and, simultaneously make the sealed volume as small as possible. In the case of additive manufacturing, equipment that would be moved outside the inert volume might include the motion systems that translate the part and/or printhead as well as thermal insulation materials. This helps achieve a high purity inert environment inside the sealed volume by removing sources of contamination. It helps achieve thermal control because motion systems cannot tolerate exposure to the required temperatures and would have to be protected thermally. This, in turn would complicate the maintenance of the high temperature environment because it would require insulation and/or cooling inside the high temperature environment. Also, removing hardware from within the inert volume, allows for the reduction of this volume, which also makes it easier to maintain cleanliness and high temperatures, including by reducing the gas flow and power requirements. However, since the motion systems are now outside the sealed volume, the sealed volume must now be able to accommodate some relative motion of its components, while maintaining its desired level of purity. To illustrate this, consider the example of a 3D Printer of an architecture where build platform moves underneath a stationary printhead on a three axis cartesian motion system. The moving build platform exists inside the inert volume while the motion components such as motors, screws, belts, rails, ways, bearings or the like exist external to the volume. Clearly the three axes of motion (X, Y, and Z) must somehow break, pass or otherwise couple through the barrier of the inert volume to enable the build platform to move with respect to the stationary printhead. Many methods of accomplishing this would involve dynamic seals between portions of the build volume and portions of the motion system. Generally, these seals may have to tolerate large amounts of motion, at potentially elevated temperatures and at potentially high speeds and accelerations and continue to perform as intended over the lifetime of the seal. Furthermore, these seals may have to permit motion in more than one axis. For example, in 3D Printing, the X and Y axes are often both moved, sometimes simultaneously, as one layer of the part is printed. Therefore, any seal between the X and Y axes in the aforementioned architecture may seal while permitting relative motion in the X-Y plane, which is much more complicated and demanding than sealing a single axis.

An aspect of the current disclosure relates to the use and design of Péclet gap seals in additive manufacturing applications. A Péclet gap seal (or Péclet seal) is defined here as a seal created and maintained by a thin film of gas flowing between two components, where the gas film is largely provided by an external gas supply. Such a seal may operate in a static scenario (where there is no relative motion between the two components), or a dynamic scenario (where there is relative motion between the two components), or some combination thereof. In the current disclosure, a Péclet gap seal, of a design to be described shortly, is used to seal between two components of an assembly that can move relative to one another. It should be noted that in dynamic scenarios, any contribution to the sealing gas film created by relative motion of the two components is typically small with respect to the contribution from the external gas supply. Additionally, pressure differentials across the sealing boundary are typically very small. This is contrasted to other fluidic seals which may exploit large pressure gradients or viscous drag effects.

While the Péclet gap seal may not form a seal in the traditional sense of prohibiting any flow whatsoever, Applicants nevertheless refer to the gap as a Péclet gap seal to emphasize the relatively high degree of isolation between the atmosphere outside the volume and the atmosphere inside the sealed volume. For example, a high degree of isolation between air outside and an inert environment inside can be achieved. While the Péclet gap seal as described herein can provide ppm, or even ppb isolation, it can be considered reasonable to describe it as a "seal" in the sense that it seals air from the outlet from reaching the inside of the sealed volume. Furthermore, while much of the discussion pertains to the type of atmosphere which is able to be maintained within the sealed volume, it is important to recall this seal, in conjunction with other engineering measures in the system, may be utilized to isolate the temperature of the atmosphere inside from outside.

The principle of operation of such a dynamic Péclet gap seal in a planar surface embodiment is illustrated schematically in cross-sectional view FIG. 1A and corresponding detail view 1B. Here, the outside atmosphere 1001 is isolated from the controlled atmosphere 1002 inside the sealed volume. This isolation is accomplished by one seal and two mechanical components. The sealed volume is effectively defined by the combination of the volume enclosure 1003, the opposing sealing plate 1004, and the Péclet gap seal 1005, illustrated here by arrows representing a simplistic view of the gas flow through the gap. The seal is formed by gas flowing through the thin gap of dimension 1006 between the lower surface of the flat sealing plate 1004 and the upper surface of the volume enclosure 1003 over sealing length 1007. This geometry of volume enclosure creates a circumferential ledge substantially parallel to the sealing plate, separated by a circumferential gap. As will be discussed, the dimensions regarding this gap are of great importance; Here, it is enforced to be constant around the periphery of the seal through means not shown. The sealing gas which forms the seal is supplied by source 1008 into the sealed volume, for example by a mass flow controller or pressure regulator, and is preferably of the atmosphere and purity which is desirable within the sealed volume. By way of non-limiting examples, this could be argon, nitrogen, carbon dioxide, helium, or blends thereof. The thin gap imposes a fluidic resistance which impedes the flow of gas, and as gas is being admitted to the sealed volume, the pressure inside will necessarily rise above ambient pressure. This pressure inside the volume then acts as the driving force to force gas to flow through the thin gap, forming the Péclet gap seal. Importantly, the volume enclosure 1003 is free to move translationally relative to the sealing plate 1004 in the left and right directions. It is also capable of translating in the directions into and out of the page relative to the sealing plate and rotating relative to the sealing plate. Therefore, this seal can be said to permit three degrees-of-freedom (two translational, and one rotational), but need not utilize all of them, or all of them simultaneously. Importantly, the atmosphere outside the sealed volume may remain substantially isolated from the controlled atmosphere inside the sealed volume so long as enclosure remains within the extents of the sealing plate (i.e. the geometry which defines the Péclet gap seal does not change) and there is sufficient gas flow from source 1008.

The benefits of using such a Péclet gap seal—as opposed to other sealing techniques, such as O-ring seals—are myriad, but critically they are non-contact which may remove concerns surrounding the sealing components wearing and may enable extremely low-friction motion between the components of the seal without any hysteresis. Furthermore, as they do not rely on any elastomeric or polymeric element, they may be designed to be suitable for use at the elevated temperatures encountered in some additive manufacturing applications. Similarly, as they do not rely on any lubricant, sealant, oil or the like, they alleviate concerns about particulate generation, thermal stability and off-gassing into the controlled environment inside the sealed volume.

Figure 4A:
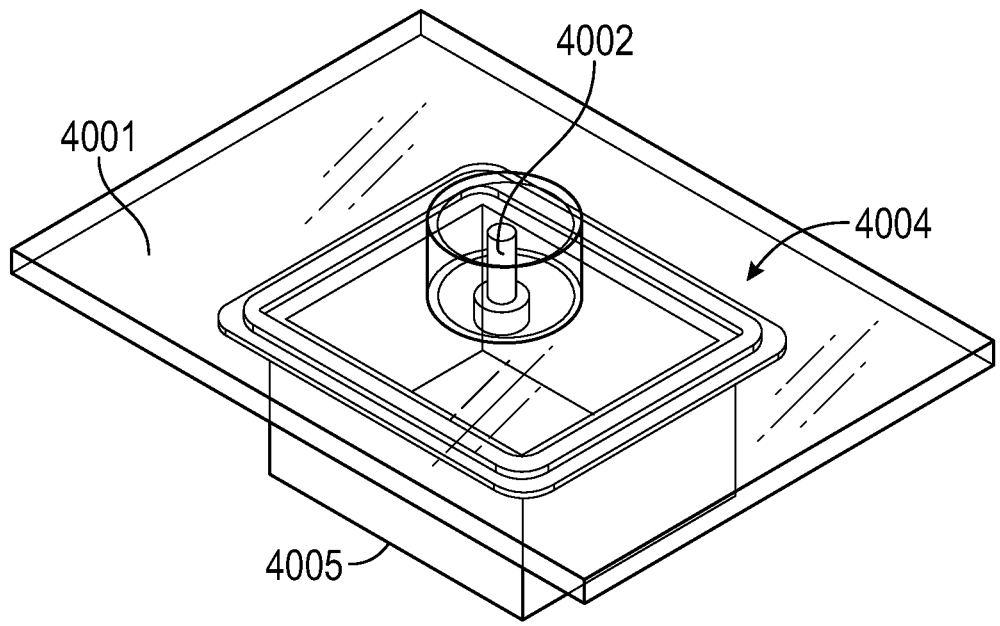
FIGS. 4A-B show an embodiment of the sealed volume in the context of an additive manufacturing system.
Figure 4B:
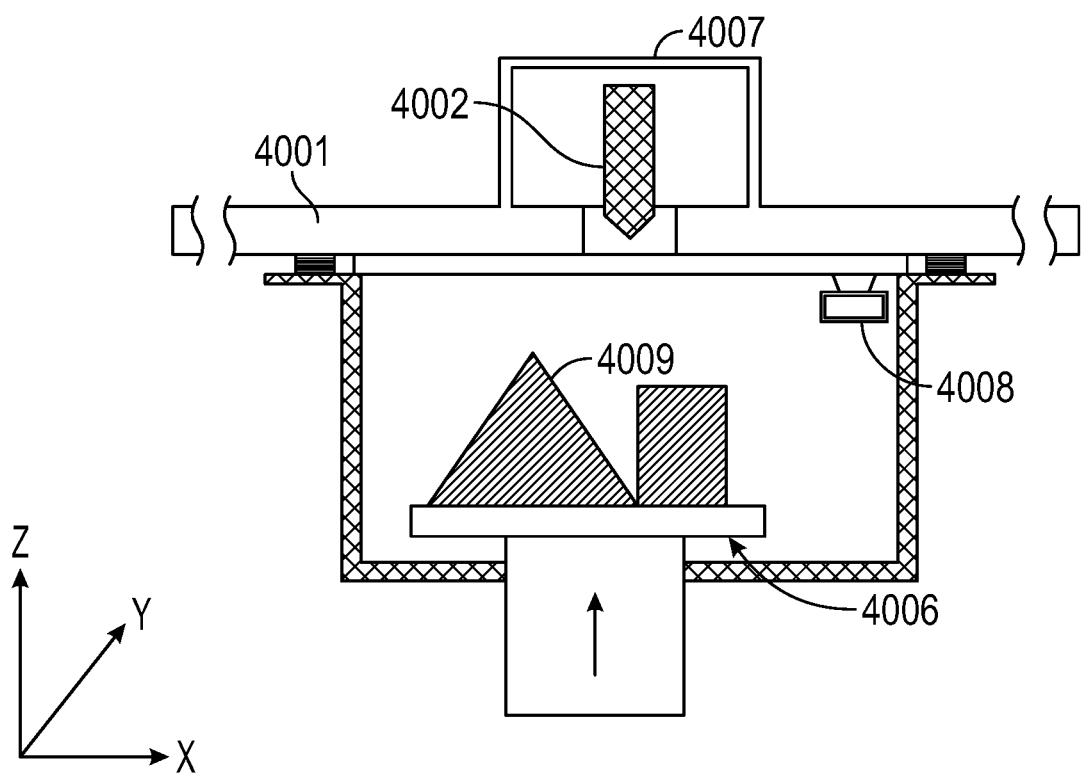

FIGS. 4A-4B shows how such a Péclet gap seal can be utilized in the context of an additive manufacturing system. Importantly, this embodiment shows how various subsystems required for printing and ancillary systems may function or act as required within the sealed volume without compromising isolation while allowing for the requisite relative motion between components. In one preferred embodiment of an additive manufacturing system, during operating, the sealing plate 4001, along with any components such as printhead 4002 attached to it or penetrating through it, may translate relative to the seal 4003, seal perimeter 4004 and enclosure 4005 without compromising its isolation. The build platform 4006 upon which the printed part 4009 is fabricated is housed within the sealed volume, while the nozzle for additive manufacturing maintains line-of-sight to the printed part through a cutout near the center of the sealing plate. The nozzle forms part of the printhead assembly, which may include other hardware such as heaters, sensors, material feeders and the like and is housed within an additional printhead enclosure volume, which maintains air-tightness with the top plate and therefore also forms part of the sealed environment. The entire sealed volume is moved translationally in the x-y plane underneath the top plate, enabling the nozzle to be translated relative to part. Under normal operation during printing, the cutout of the printhead which is contained in printhead housing 4007 stays within the periphery of the Péclet gap seal, keeping it inside the sealed volume and therefore inside the controlled environment. A third translation degree of freedom forms the Z-axis which moves the print platform with respect to the nozzle. This may be accomplished, for example, by moving the nozzle downwards with respect to the print platform (details of this actuation not shown). A preferred embodiment for such a single degree-of-freedom translational axis will be presented in FIGS. 6A-6B and FIG. 8. Ancillary systems or hardware 4008 such as nozzle service stations, for example, may exist within the sealed volume and be supplied with power, signal, plumbing or any other required connections by the use of feedthroughs, many different styles of which are known in the art. Should such systems or hardware require relative motion penetrating through the sealed volume, these may also utilize the various embodiments of Péclet gap seals described herein to maintain isolation.

The principle by which these Péclet gap seals function can be designed and analyzed with the aid of the non-dimensional Péclet number. This number captures the ratio of the advective mass transport to diffusive mass transport in a flow. For a one-dimensional flow, the Péclet number, Pe, is defined as:

$$Pe = \frac{vL}{D} \qquad \text{Eqn. (1)}$$

Where:
L=sealing length along the flow direction (m)
v=average gas velocity through the sealing gap (m/s)
D=binary diffusivity of one gas species in another at operating temperature and pressure (m$^2$/s)

This Péclet number can be useful to the extent that the larger the Péclet number, the better the sealing. It can be thought of as sufficiently high velocity of gas travelling through the sealing gap from inside the clean volume to outside substantially prohibits contaminants from diffusing "upstream" (from outside, to inside the sealed volume). Specifically, the isolation of a Péclet gap seal can be calculated in accordance with the following equation:

$$I = e^{-Pe} \qquad \text{Eqn. (2)}$$

Where:
I=isolation (unitless), defined as the ratio of concentration of a contaminant inside the sealed volume to its concentration outside.

The preceding equation assumes steady state one dimensional gas flow from a sealed volume to the outside through Péclet gap seal and may yield an approximation for the concentration of the contaminant species within the sealed volume if the system has no other real or virtual leaks other than the Péclet gap seal itself. It further assumes the gas admitted into the volume and which forms the seal is perfectly pure.

Figure 2:
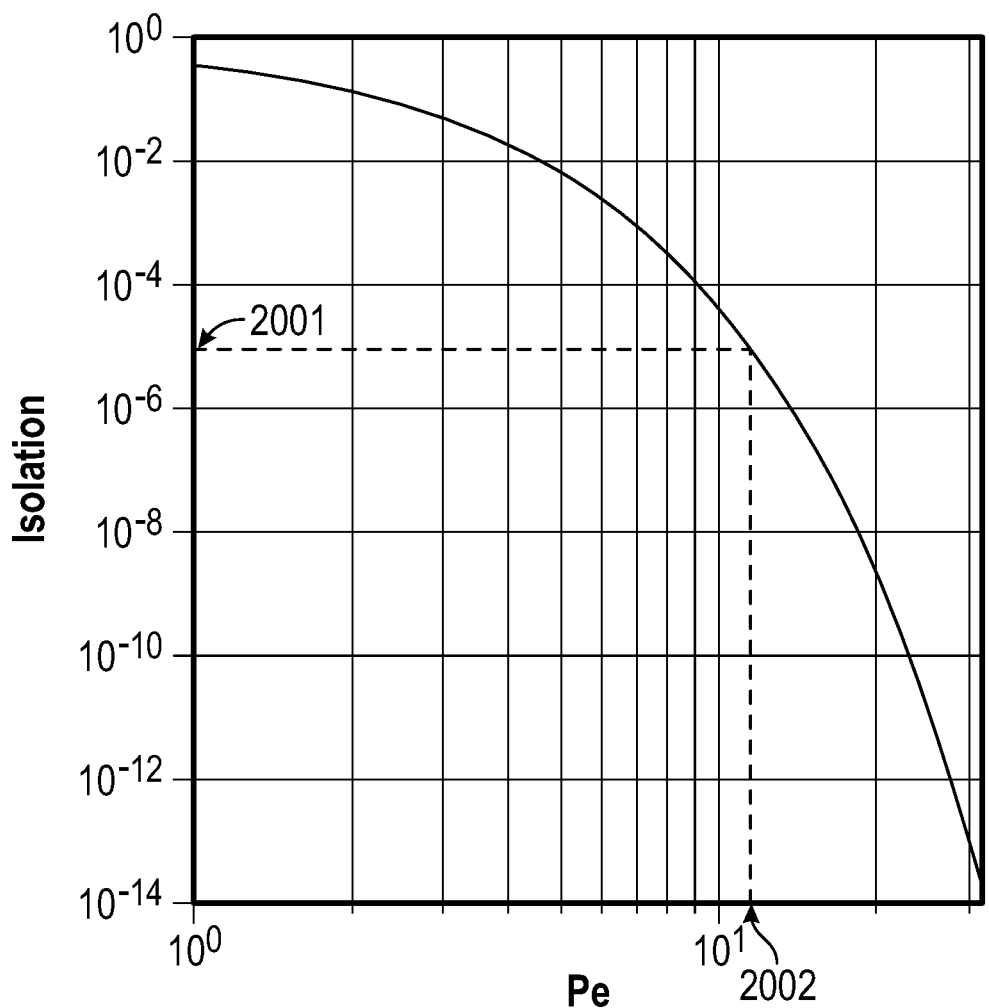
FIG. 2 is a plot of isolation versus the non-dimensional Péclet number.

For example, in order to isolate the outside of the build volume with standard air (approximately 200E3 ppm oxygen) from the inside of the sealed volume which may desirable be kept around 2 ppm oxygen, the requisite isolation can be determined to be approximately 10^-5, and the requisite Péclet number is approximately 11.5. This is illustrated graphically with reference to FIG. 2 on tie lines 2001 and 2002, which plots Eqn. (2) with isolation (the ratio of contaminant concentration inside the sealed to its concentration outside) to the Péclet number of the gap seal. FIG. 2 further illustrates the ease in which additional order of magnitudes of isolation can be readily achieved by marginal increases to the Péclet number. For example, by only doubling the Pe number to approximately 25, the theoretical isolation of such as seal improves by another 5 orders of magnitude, to 10^-10.

Numerous embodiments and examples of Péclet gap seals disclosed herein can be appreciated using the one-dimensional model and approximation to, for example, understand that Péclet gap sealing can be an effective technique, such that it can be possible to generate highly varied solutions with massive theoretical margin.

This one-dimensional treatment is easily extended to cover the planar Péclet gap seals discussed by assuming that the sealing perimeter is large with respect to the sealing length L and simply "cutting" and "unwrapping" the geometry of the seal into a single rectangular fluid pathway. The mean fluid velocity through the seal can then be found by:

$$v = \frac{Q}{wt} \qquad \text{Eqn. (3)}$$

Where:
Q=volumetric flow rate (m³/s)
t=gap dimension (m)
w=total width of the seal (m)

With such an assumption, one skilled in the art would find it a simple exercise to select an appropriate gap dimension and sealing length to yield the requite average fluid velocity through the sealing gap, given the sealing isolation required for the system at hand with the relevant diffusivity, while being conscientious to the total gas consumption and pressures required to do.

The analysis involving the Péclet number above allows for the preliminary design of the geometry and flow through the seal. However, Applicants recognize that the above equations correspond to a relatively simple one-dimensional model. This model can generally correspond to physical systems configured to achieve ppm isolation using relatively little gas flow for reasonable gap dimensions and sealing perimeters. Through experimentation it has been found that operation with Péclet numbers marginally above the theoretical is both trivial and advisable to make up for practical effects. Moreover, for reasonable designs, it can be desirable to evaluate various practical considerations in further detail beyond the theoretical design of the Péclet gap seal. Such practical considerations can tend to dominate performance limitations, chief among them being gap dimension variations. Further implications regarding surface selection, relative motion of the components and temperature will also be presented.

Figure 1B:
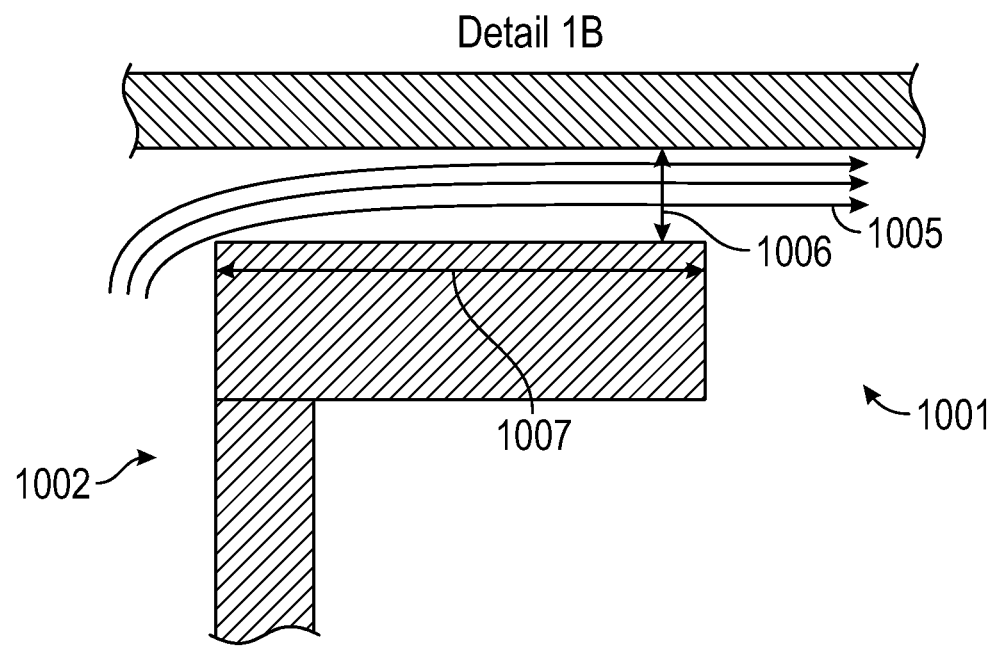

Consider the embodiment of a Péclet gap seal as depicted in FIG. 1. If the source 1008 is assumed to be a mass flow controller and held fixed at its setpoint, it is possible to analyze the effect of varying gap dimension has on the isolation of the seal. Intuitively, larger gap dimensions have larger cross-sectional flow area for the seal, which will have lower average velocities for a given flow rate though it, and therefore reduced isolation. In fact, the sensitivity of the average velocity and, assuming constant sealing length and diffusivity, therefore Péclet number can be found to be:

$$v \propto t^2 \qquad \text{Eqn. (4)}$$

To demonstrate the impact of this sensitivity, consider the example where, unknowingly, a region of the sealing perimeter have larger than nominal gap dimensions by a factor of two, while, simultaneously, another region has a smaller than nominal gap dimensions by a factor of two (but the total effective fluidic resistance of the seal remains unchanged). Such a range of gap dimensions may be expected between two reasonably flat surfaces over the lengths and travels contemplated when nominal gaps are measured in the 10 s or 100 s of microns. The portion of the seal with a small gap dimension gets starved of velocity, effectively penalizing its isolation, while the region with a larger than nominal gap gets surplus velocity. Specifically, the local flow velocity can vary between 4× and ¼× the nominal flow velocity. Thus, the flow velocity differs by a factor of 16 between the two regions. For acceptable total gas flow rates, this range of variation is highly likely to yield an unacceptably low local Péclet number and therefore isolation in the side of the seal with the small gap, underlining the importance of maintaining a consistent, uniform gap dimension around the entire perimeter of the Péclet gap seal.

For an example of typical system dimensions and operating parameters, it has been determined experimentally that Péclet numbers in the range of 10-100 are sufficient to maintain $O_2$ and $H_2O$ contamination levels less than 50 ppm (volumetric) range within the sealed environment, for a sealing length of approximately 20 mm and gap dimension of approximately 100 microns when suppling the sealed volume with what is sold commercially as 'ultra-high-purity' argon. The pressures inside the volume may range from approximately 100-1000 Pa. As the sealing perimeter increases, however, it becomes increasingly challenging to manufacture and maintain the required flatness of the components which for the opposing sealing surfaces over the length scales required. This challenge is further exacerbated by exogenous factors such as variations in component temperature, or relative motion of the two components. Accommodating looser flatness tolerances requires increasing the average gap dimension between the sealing surfaces, which, to produce the same flow velocity between the components and therefore the same isolation, requires increased gas consumption. More critically, it also becomes increasingly challenging to ensure a consistent displacement between the two components over the entire perimeter seal and if operating with insufficient margin on gas flow, the isolation may be negatively impacted, as the preceding analysis shows.

When the components defining the Péclet gap seal move relative to each other, there is another practical effect. Due to the no-slip boundary condition, both the shape of the velocity profile and its magnitude change from the static case. The exact shape of the flow can be predicted with the well-known equation for Couette flow between two parallel plates with a pressure differential, which is the superposition of a parabolic and linear velocity profile. The linear component can either add favorably or unfavorably (in terms of average flow velocity), depending on the direction of the relative motion of the components with respect to the direction of the gas velocity through the sealing gap. A planar dynamic Péclet gap seal will have portions of the sealing perimeter which benefit from the motion while the mean velocity and therefore the isolation in other area will be penalized. For many systems contemplated herein, the designed sealing gas velocities are typical similar if not larger if not substantially larger than the magnitude of the relative motion between the components. Additional operating margin to account for the worst-case motion can easily be achieved by increasing the flow rate of gas into the sealed volume. It should be noted again that it is the average local gas velocity through the seal which is paramount. A portion of the streamlines in any one location could even have a velocity of negative magnitude (that is to say, the gas flows backwards, from outside to inside), however the seal's isolation may not be compromised so long as the average flow velocity of all the streamlines through the gap dimension is sufficiently positive. This is because the velocity of a contaminant species in the direction perpendicular to the streamlines through the gap is typical much larger than flow velocity; due to diffusion perpendicular to the primary flow direction, there may effectively be significant mixing through the gap dimension. This is another reason the 1D analysis presented earlier may be used to great effect. Further analysis may be warranted for rotational degrees of freedom, especially those at higher velocities.

Another consideration when designing a Péclet gap seal is temperature. As the temperature of a fluid increases, its density typically decreases while its viscosity tends to increase. Furthermore, the diffusivity of two species nominally scales with $T^{3/2}$. For this reason, it is important to analyze the system in question at the expected operating conditions.

Returning to the challenge of maintaining a uniform gap dimension, we introduce a second preferred embodiment of the Péclet gap seal: the use of an aerostatic bearing, and further preferably, a porous medium aerostatic bearing, as at least a portion of one of the opposing surfaces of a Péclet gap seal. Conventionally, such aerostatic bearings may also be referred to air bearings, and typically operate by using a thin film of pressurized gas (although not necessarily air) to effectively provide a reaction force between two surfaces. One or more elements provide a high fluidic resistance, such as small a groove, series of orifices, or, preferably, the inherent resistance through the tortuous small pathways in a porous medium.

The most simplistic model of an air bearing is as two fluidic resistances in series. The first resistance, R1, is inherent in the construction of the air bearing. In the case of a traditional orifice air bearing, this resistance is provided by the restriction of the bearing orifice. In the case of a porous media air bearing (upon which the remainder of this discussion will focus), this resistance can be described approximately by Darcy's law for low Reynolds numbers as:

$$R_{bearing} = \frac{\mu x}{kA} \qquad \text{Eqn. (5)}$$

where μ=the dynamic viscosity of the fluid (Pa*s), x=the length through the porous media through which the fluid flows (m), k=the permeability of the specific media (m^2), and A=the cross-sectional area of the porous media over which flow occurs (m^2).

The second resistance, R2, is formed by the flow of gas out of the air bearing, and through the gap between the air bearing face and the sealing surface face. The Hagen-Poiseuille equation can be used to calculate this resistance for a given geometry, which will be found to be sensitive to the reciprocal of the cube of the gap dimension.

When these two resistances are placed in series, they form what is in essence a pressure divider, by analogy to a voltage divider in electrical circuits. A pressure will develop at the face of the air bearing which is related to the relative values of these two resistances. The resistance of the gap is highly nonlinear and varies inversely with the dimension of the gap. When the gap is large, the resistance of the gap is very low, and the pressure developed at the bearing face goes to zero. Likewise, as the gap gets very small, the resistance grows rapidly, and the pressure at the face of the bearing approaches the supply pressure being fed into the bearing. Meanwhile, the parameters of the air bearing—specifically in the case of a permeable-media bearing, the flow length L, and the permeability k—can be tuned to provide a given bearing fly height at a given load. Fly heights in commercial air bearings are generally designed to be in the range of 1-20 μm and can support loads from tens to thousands of Newtons, or even higher, depending on the size, design and supply pressure.

Notably, a consequence of the highly nonlinear resistance in the gap is that an air bearing's stiffness is likewise highly nonlinear, and grows extremely rapidly as the bearing gap is reduced. Consequently, air bearings inherently maintain a highly consistent gap between the air bearing face and the opposing sealing surface face. The air bearing also enables nearly frictionless motion relative to its sealing surface, with substantial specific load capacities. When coupled with the very small gap thicknesses that it operates at, the air bearing is well-matched for use as an Péclet gap seal.

Of paramount importance is the relative magnitudes of the resistance in the bearing with respect to the resistance of the gap. Generally, the bearing resistance is larger than and often orders of magnitude larger than the resistance of the gap. Therefore, it may be a reasonable assumption to neglect the gap resistance. In so doing, the velocity of the flow through the gap may be derived to have the following sensitivity to the gap dimension:

$$v \propto \frac{1}{t} \qquad \text{Eqn. (6)}$$

This proportionality will later be contrasted with that for a Péclet gap seal with an aerostatic element.

Figure 3A:
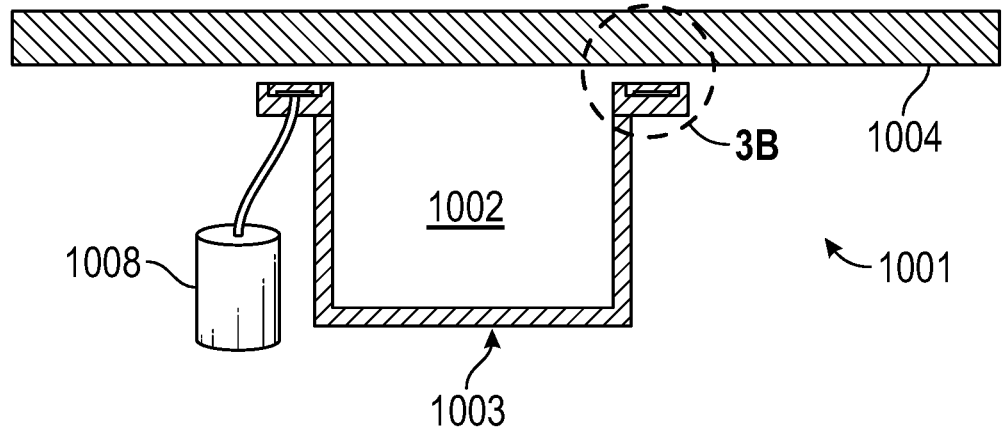
FIGS. 3A-3B show schematically a sealed volume and the details of the sealing principle using a distributor on a planar surface.
Figure 3B:
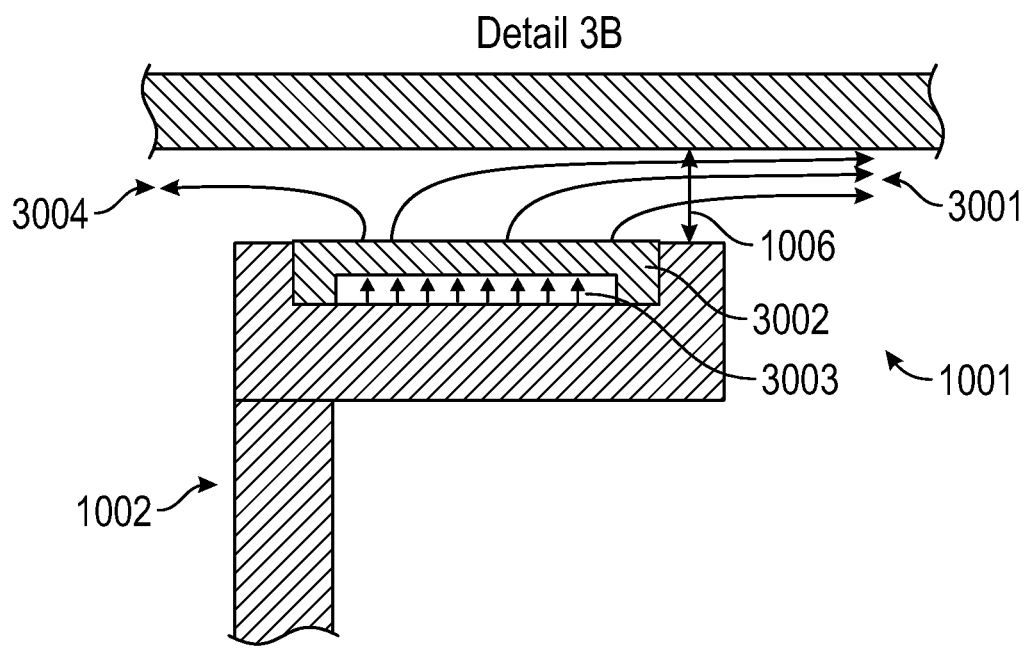

FIG. 3 illustrates an embodiment of a planar Péclet gap seal utilizing an aerostatic element. As in FIG. 1, the controlled environment 1002 within the sealed volume is isolated from the outside atmosphere 1001 by a thin film of gas illustrated by a simplistic representation of the gas flow by arrows 3001, with the remainder formed by the air-tight boundary formed by the enclosure walls 1003 and the sealing plate 1004. Here, the aerostatic element is represented as a porous medium 3002 which is mechanically joined to a portion of the enclosure. The distance between the upper surface of the aerostatic element and the lower surface of the sealing plate 1003 form the gap dimension 1006. As depicted, the portion of the aerostatic element which emits gas into the seal need not extend over the whole length of the seal. Pressurized gas is admitted into cavity 3003 from supply 1008, where it then flows through the high fluidic resistance of the aerostatic bearing element. In this two-dimensional view, it should be understood that the cavity and seal form a continuous, uninterrupted seal around the sealing perimeter. The gas that is admitted will either flow outwards, as shown with arrows 3001, thus contributing to the sealing function, or, may flow towards the clean volume as shown with arrow 3004. As more gas flows inwards, the pressure inside the seal volume with respect to the atmosphere outside will tend to increase. This pressure differential can then serve to drive additional flow through the gap, as in the Péclet gap seals without an aerostatic element discussed earlier. For this reason, in many practical embodiments of aerostatic Péclet gap seals, much or nearly all, or all of the gas admitted to the high resistance element will tend to flow outwards, benefiting the seal.

To use an aerostatic bearing element in a Péclet gap seal, the bearing is preferably fed with the same gas that is in the pure environment, at the required purity level. For instance, if the atmosphere inside the sealed volume is desired to contain argon with no more than 10 ppm $O_2$ contamination, the air bearing should be fed with argon with 10 ppm $O_2$ contamination, and preferably less than 10 ppm $O_2$ contamination. The pressure of gas that is fed into the aerostatic bearing element may preferably be higher than the pressure present in the sealed volume. The pressure of gas that is fed into the aerostatic bearing element may further preferably be higher than the pressure of the atmosphere outside the sealed volume. As discussed, gas from inside the sealed volume may further be made to flow from the sealed volume to outside through the sealing gap, by ensuring that the pressure inside the sealed volume is higher than that present in the sealing gap and the present outside the sealed volume.

The aerostatic bearing element may be constructed using any of a number of techniques common in existing air aerostatic bearing manufacture, which will be familiar to one skilled in the art. As discussed earlier, these include orifice aerostatic bearings, where gas flows through a single small orifice at high pressure and over a flat annulus to produce a bearing layer; and porous media aerostatic bearings, where gas flows through a porous material such as graphite to form a cushion over the face of the bearing; among others.

The use of an aerostatic bearing as a Péclet gap seal provides the critical benefit of maintaining a highly consistent, small gap dimension for the Péclet gap seal to develop due to the corresponding high and uniform exit velocities of the gas. The flow of gas out of the air bearing also contributes to advective mass transfer in the gap and improves the performance of the Péclet gap seal. The primary challenge in implementing aerostatic bearings in this manner is the difficulty associated with producing sufficiently flat surfaces for the air bearing face and particularly the sealing surface face. While the development of sufficient pressure at the bearing face to enable load-bearing makes an aerostatic bearing much less susceptible to inadvertent mechanical contact between the sealing surface than those Péclet gap seals without an aerostatic bearing, a sufficiently large variation in the flatness of the sealing surfaces over a sufficiently short length can cause a local bearing pressure that overcomes the local stiffness of the bearing and causes the air bearing and sealing surface to collide, which may be referred to as "crashing" or "high-pointing". One preferred embodiment that addresses this challenge is a highly compliant aerostatic bearing, such as a porous media bearing formed from a thin sheet of a porous metal medium or thin piece of graphite, which can conform to any local flatness variations opposing sealing surface. A second preferred embodiment instead uses a highly compliant sealing surface, such as a thin sheet of glass, with a substantially rigid aerostatic bearing. In this embodiment, the sealing surface conforms to the air bearing, negating the impact of any flatness variation in the sealing surface. In many embodiments, load-carrying aerostatic bearings and the surface on which they ride are "pre-loaded" towards each other by various techniques known in the art, such as springs, gas or fluid cylinders, magnets, or vacuum, for example. Appropriately distributed preloading allows for the sealing surface of the compliant element to conform to the sealing surface of the substantially rigid element.

In another embodiment, the aerostatic Péclet gap seal may be designed or operated in such a way where, despite being supplied with gas, the resulting gas cushion which develops is not adequate to support meaningful load or pre-load. This can be accomplished, for example, by running a bearing with insufficient flow rate or pressure, decreasing the surface area of the aerostatic element, or maintaining a gap dimension which is too large (i.e. where the bearing has little stiffness), for example.

In other words, in this embodiment, the aerostatic is not, predominantly, acting as bearing. Rather, the internal channels or porosity are acting as a distributor to deliver gas flow within the Péclet gap seal and the function of maintaining the gap between them falls to another component.

In fact, the aerostatic bearing need not be designed or operated for load-carrying capacity. For sealing function, it is the orders of magnitude difference in fluidic resistance between the aerostatic bearing and the gap of the seal which provides much of the sealing benefit. Henceforward, Applicants will refer to a gas distributor (or simply, a distributor), which should be understood to mean any component placed near the periphery of the Péclet gap seal that is designed to provide a large fluidic resistance, relative to the fluidic resistance of flow through the sealing gap, whether or not it is capable or operated in such a way to apply a meaningful reaction force to the opposing sealing surface.

Figure 5A:
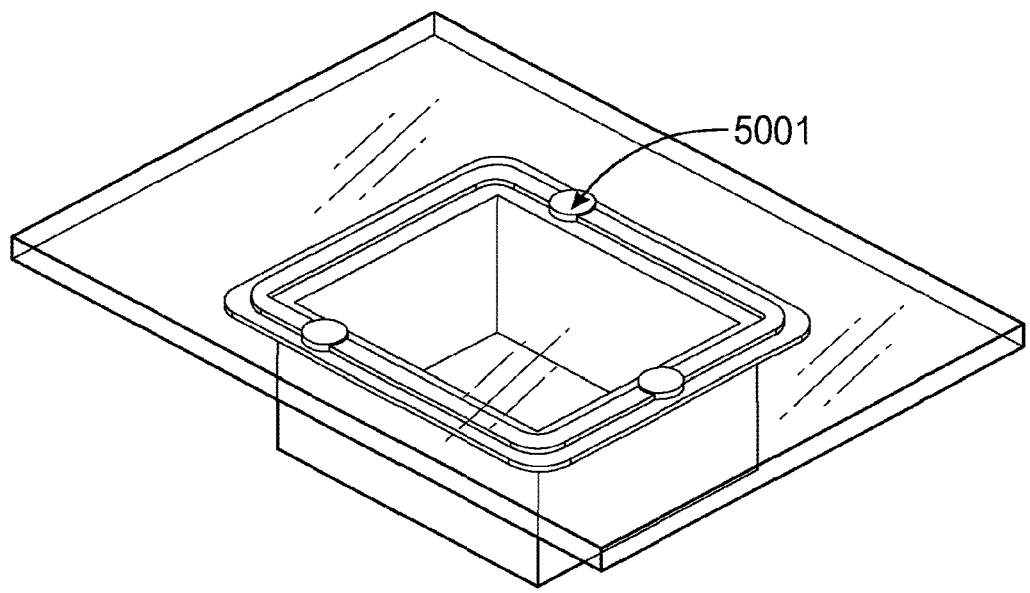
FIGS. 5A-C show an embodiment of the sealed volume including load-supporting aerostatic bearings.

In this embodiment, a variant of which is shown in FIG. 5A, the distributor element is coupled to three primary contact pads, with the distributor's face displaced below those pads by some distance. This distance preferably is in the range of 50 to 500 microns. These primary contact pads provide a bearing between the sealing surface and the assembly comprising the distributor, primary contact pads, and other attached components. They may be implemented using a variety of techniques, which are detailed further below. They may further preferably be mechanically separated from the distributor's face, so they can rotate and/or translate relative to the plane of the distributor face. The position of the sealing surface is defined by the contact pads. Since there are three pads, and their area is small relative to the area enclosed by the distributor element, the flatness tolerance required of the sealing surface may be reduced without running the risk of having the distributor "crash" or "high-point" on asperities on the top plate. Additionally, since the distributor is no longer required to provide a specific pressure at its face, the supply pressure to the distributor—and thus, the gas consumption of the distributor—can be substantially reduced below that used in an air bearing-based gap seal.

Figure 5B:
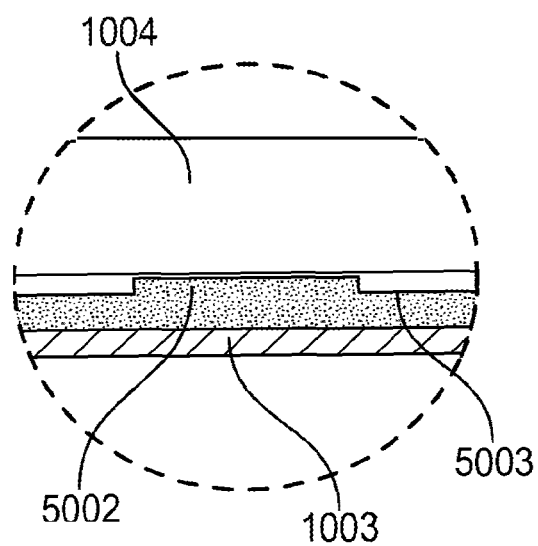
Figure 5C:
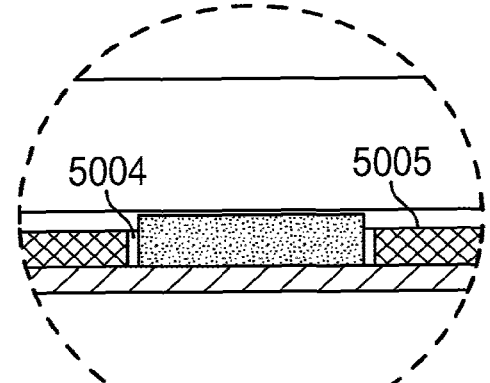

In the preferred embodiment shown in FIG. 5A, three primary contact pads 5001 are shown; however, it will be obvious to one skilled in the art that more than three contact pads may be used in other preferred embodiments. Furthermore, while the gap seal shown in FIG. 5A is shown in a planar embodiment, it will be obvious to one skilled in the art that the core concept of a distributor supported on primary contact pads can be applied to other geometries, including as cylindrical and hemispherical seals. With reference to FIG. 5B each contact pad 5001 has a bearing surface 5002 which is closer to the sealing plate than a non-bearing surface 5003. In certain embodiments, the bearing surface is separated from the sealing plate by about 10 μm, while the non-bearing surface is separated from the sealing plate by about 50-500 μm. With reference to FIG. 5C, in another embodiment there is a separation gap 5004 separating non-bearing surface 5005 from the bearing surface.

Some of the embodiments of the Péclet gap seal described here—specifically, the plain surface seal embodiment, and the distributor embodiment—rely on the use of primary contact pads to provide a bearing against the sealing surface, and locate the opposing sealing surfaces at a defined distance from each other. These pads generically should be able to tolerate the entire operating regime of the Péclet gap seal—especially in temperature—without deforming or otherwise failing. They should also introduce minimal friction to motion between the Péclet gap seal and the sealing surface. Preferably, the number of pads used will exactly constrain the Péclet gap seal relative to the sealing surface. For example, in the case of a planar Péclet gap seal, three bearing pads exactly constrain the seal relative to the sealing surface by limiting one degree of translation and two degrees of rotation. However, there may be certain embodiments where greater or lesser number of pads are preferable.

As discussed previously, while primary contact pads have generally been shown here in the context of a planar embodiment, it will be understood that the concept of primary contact pads supporting a separate sealing surface may be applied to Péclet gap seals of many different geometries. For example, a cylindrical Péclet gap seal could be supported at either end by either continuous or segmented cylindrical bearing pads.

Furthermore, while primary contact pads have been previously described as physically separate from the Péclet gap seal they support, there may be implementations where it is preferable to implement the support pads integrally to the sealing perimeter itself. By way of example, a distributor Péclet gap seal made from a porous medium may have primary contact pads machined into it, as shown in FIG. 5A. In this specific implementation, the gas supply for these pads may further preferably be fluidically separated from the gas supply for the distributor.

The primary contact pads may be implemented using a multitude of techniques. In one preferred embodiment, the pads are implemented using sliding contact bearings. For example, Teflon pads may be used against a steel surface to provide a low-friction interface.

In another preferred embodiment, the pads are implemented using rolling contact bearings, such as ball transfer blocks.

In another preferred embodiment, the pads are implemented using hydrostatic bearings. The Péclet gap seal may be used to prevent fluid from the hydrostatic bearings from entering into the high-purity sealed volume.

In another preferred embodiment, the pads are implemented using magnetic levitation bearings.

In a further preferred embodiment, the primary contact pads are located substantially outside of the perimeter of the Péclet gap seal, and are connected to a separate gas supply from the seal and sealed volume. This separate gas supply may further preferably be of a different gas than that used in the Péclet gap seal and high-purity volume, such as ambient air provided by a pump. Since the primary contact pads are displaced substantially from the perimeter of the Péclet gap seal, the low-purity gas emission from the pads does not influence the performance of the seal. In this manner, the total consumption of high-purity gas may be substantially reduced.

The above descriptions of aerostatic Péclet gap seals have been agnostic as to the specific materials required to construct an aerostatic element. A wide variety of materials can be used depending on the specific requirements placed on the seal, such as operating temperature; gas species present in the sealed volume; gas species or other materials to be kept out of the sealed volume; assembly and manufacturability concerns; and others. Generically, though, the material used to form an aerostatic Péclet gap seal should be dimensionally stable throughout its operating regime, especially with regards to temperature; and should either not excessively sorb contaminants, or provide some means of purging contaminants.

Several interesting embodiments exist providing different functionality for the case of aerostatic Péclet gap seal based on permeable media. In one preferred embodiment, the permeable medium is a permeable semi-metal or ceramic, such as graphite, porous silicon carbide, or bisque alumina, among others. Notably, many of these materials maintain high strength and dimensional stability at extremely high temperatures, making them ideally suited for high temperature applications.

In a second preferred embodiment, the permeable medium is a permeable metallic matrix. An example of such a material is the sintered porous metal filter material manufactured by Mott Corporation (Farmington, CT). These materials can tolerate moderate temperatures ($T<=700°$ C.). They are also easily bonded to other metallic components using a wide variety of bonding techniques, such as welding, brazing and soldering.

The materials described above have a wide range of permeabilities. Depending on the specific design of the gap seal, the permeability of a given material (which is preferred for other reasons) may not be appropriate for that design. In other instances, it may be desirable to make certain parts of an aerostatic Péclet gap seal more permeable than others. In these cases, the permeability of the material may be decreased using a variety of techniques. At lower temperatures (below approximately 300° C.), polymeric materials such as epoxies, acrylic lacquers, and polyimides may be applied to the permeable media to reduce or eliminate permeability. At higher temperatures (above approximately 300° C.), a class of compounds known as pre-ceramic polymers may be used to seal certain permeable materials, such as graphite and bisque alumina. Such pre-ceramic polymers can be fired after application to convert them to ceramic.

The use of a distributor to introduce gas flow directly into the periphery of the gap seal is beneficial in maintaining a minimum Pe number around the full sealing perimeter, even in the event of non-uniformities in the gap dimension between the two opposing sealing surfaces. This can be illustrated with an example. Recall the example where a 2× variation in gap dimension led to a 16× variation in velocity and thus Pe number around the perimeter of the seal. Now, recalling Eqn. 6, let us suppose that one of the sealing surfaces is replaced with a distributor that is turned on and that, the flow rate out of the distributor does not change with the gap, because the primary resistance to flow for this gas is in the distributor (and not in the gap itself). We see that where the gap is thinnest, the velocity of flow from the distributor gas is higher than the velocity of flow where the gap is thicker. This is the opposite of what happens for flow that originates within the sealed volume. Thus, these two effects can compensate for each other. The flow that comes from the sealed volume can act to guarantee that the exit velocity in the gap (and the Pe number) remains high enough when the gap is larger than the target.

Figure 7:
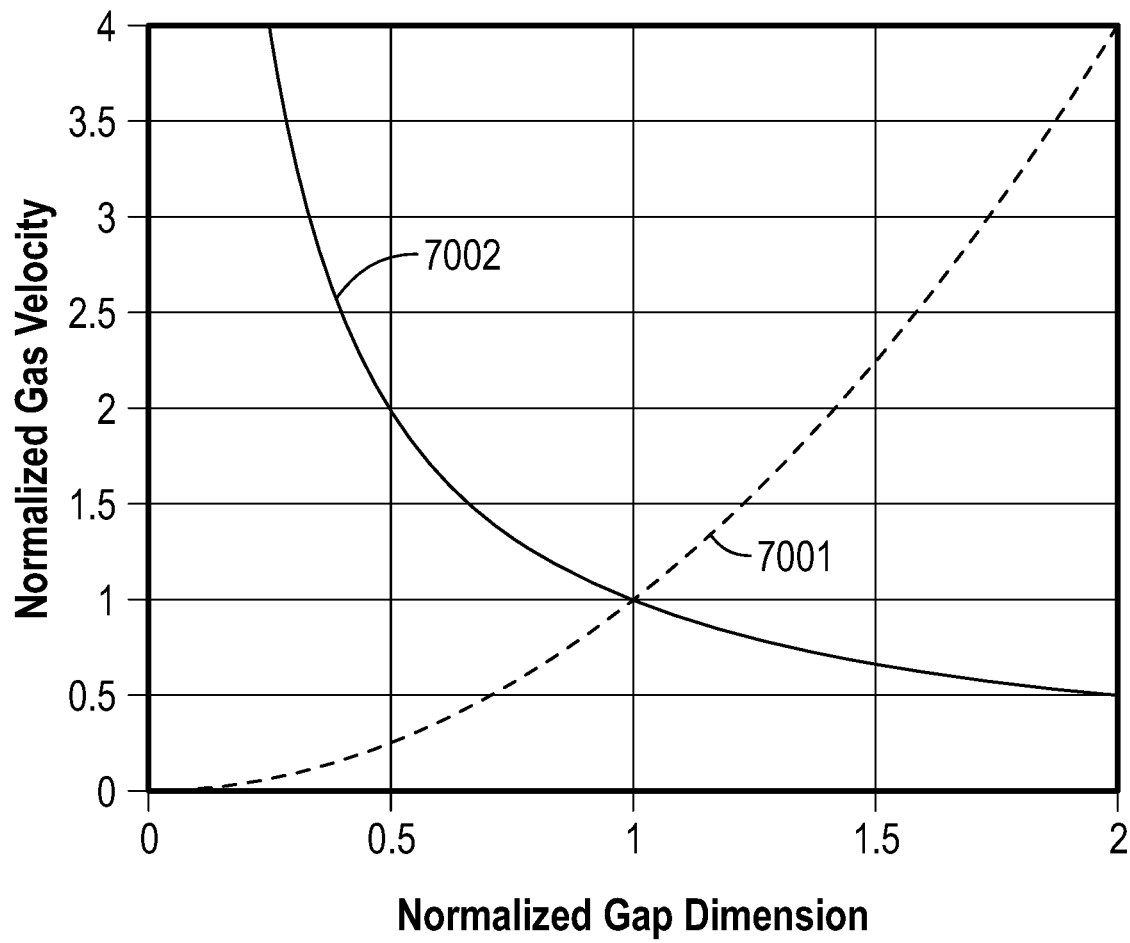
FIG. 7 plots two different behaviors of the normalized average velocity of the gas film through the sealing gap.

The co-existence of these two complementary mechanisms is an aspect of the current disclosure. These complementary mechanisms are shown in FIG. 7, which plots the gas velocity through the gap—normalized to the designed velocity—on the ordinate against the gap dimension—normalized to the nominal designed dimension—on the abscissa. The velocity's proportionality to the gap dimension squared for a Péclet gap seal is shown by the dotted curve 7001 and the proportionality to the reciprocal of the gap dimension for a Péclet gap seal with a gas distributor is shown by the solid line 7002.

Authors acknowledge that more complete analyses may be completed to predict the performance of these mixed-mode Péclet gap seals, by using, for example computation fluid dynamics or the electrical-fluidic analogy and using an appropriately discretized resistor network and a circuit solver.

It will be appreciated that the same benefit of flow out of a distributor is acting in the previous embodiment—the one where the aerostatic seal is also acting as a load-caring aerostatic bearing. Thus, in this aerostatic bearing embodiment, we have three related, but distinct contributions to the effectiveness of the Pe seal. First, gas flowing from within the inert volume exits the seal. Second, the aerostatic bearing makes the gap small and relatively consistent, thus enhancing the isolation of a given amount of gas flow. Third, the aerostatic bearing's flow exits within the gap and has much of the benefit of the flow from the distributor as described above.

While the discussion thus far has presented planar embodiments of the Péclet gap seal, one skilled in the art while recognize that the fundamental concept of such a seal can be applied to a wide range of geometries, depending on the shape of the surface to be sealed against.

Figure 6A:
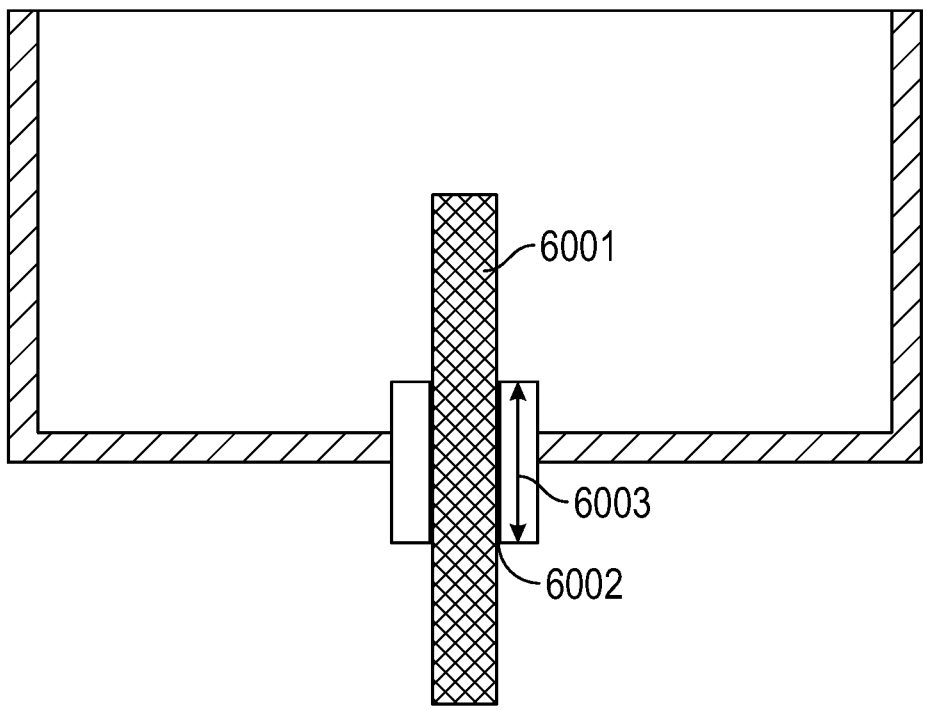
FIG. 6A-6B show schematically embodiments of the Péclet gap seal on a cylindrical surface.
Figure 6B:
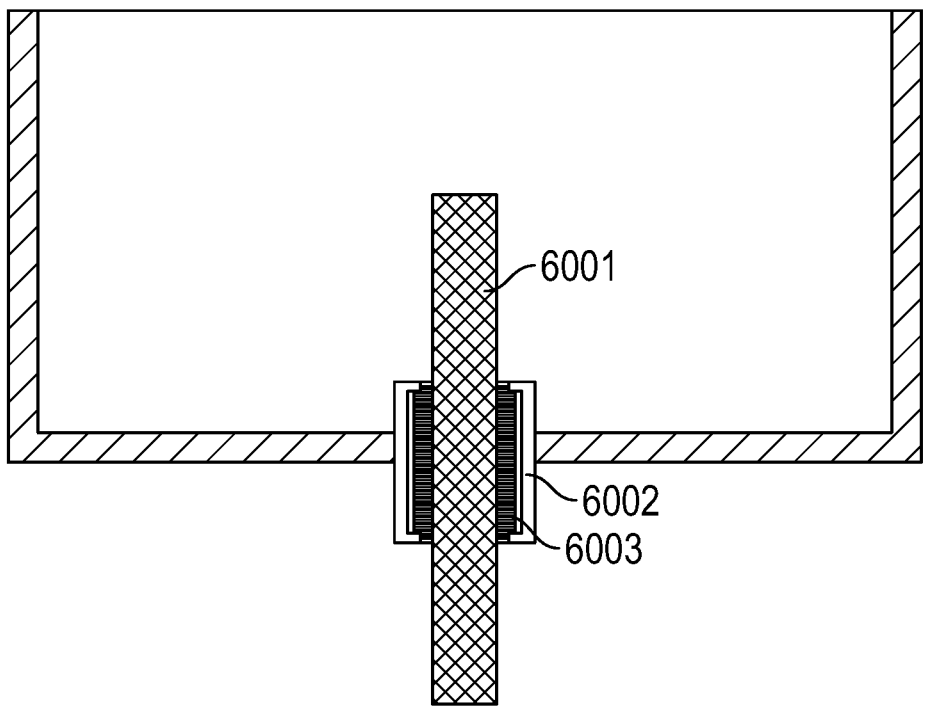

For example, FIG. 6A-6B depict an annular seal form by a shaft 6001 which penetrates the enclosure. The periphery of the shaft may be round, rectangular, hexagonal or any other two-dimensional shape. As in other embodiments, the Péclet gap seal exits in a thin gap, which here is annular between the periphery of the shaft and a slightly larger but similarly shaped hole through a component forming the boundary of the sealed volume, depicted here as the part of the enclosure.

Specifically, FIG. 6A depicts an embodiment where gas pressure from inside the clean volume is used to drive gas through the sealing gap 6002 along the flow length 6003 and in this way maintain isolation between outside and inside the clean volume.

In an alternative preferred embodiment, shown in FIG. 6B, the aerostatic element is a tubular element. As an example of how such an embodiment might be constructed, mechanical components commonly known as air bushings are available from a wide range of commercial resellers. The air bushing is installed such that it penetrates the enclosure wall and enters the sealed volume. Pressure is applied inside of the outer housing 6002 of the air bushing, and a cushion or film of gas forms between the inner surface of the air bushing flow element 6003 and the shaft. The shaft then translates through the air bushing along its axis, or rotate about its axis, without introducing contaminants into the high-purity environment inside the sealed volume. Notably, while an air bushing necessarily provides bearing support to the shaft that translates through it, the aerostatic element need not necessarily provide a load-bearing function and may operate as a non-load-bearing distributor.

Additional practical considerations for the design and operating Péclet gap seals will be discussed.

The design of the planar Péclet gap seal lends itself to production from a wide range of materials, which in turn opens up application over a comparable range of temperatures. At smaller scales, the flatness tolerances required of the two components is achievable with common manufacturing technologies. Also, as contrasted with some other embodiments, all the gas used is admitted inside the sealed volume and therefore has an opportunity to mix, which aids in improving the cleanliness of this environment by dilution and removal of any contaminants.

The sealing surface may be implemented with a wide range of materials. Generically, a material used for the sealing surface should be dimensionally stable throughout its operating regime, especially with regards to temperature; should not be permeable; should be easily workable to provide the flatness required for operation; and should either not excessively sorb contaminants. Preferably, the material will have a fine surface finish to reduce contaminant sorption. A wide range of common engineering materials fit these criteria, including many stainless steels, ceramics, and glasses.

In one preferred embodiment, a glass-ceramic is used as the sealing surface. Glass-ceramics, such as Robax (Schott North America, Elmsford, NY) or Neoceram (Nippon Electric Glass, Japan), exhibit many of the desirable properties of glasses generically, such as low surface roughness, impermeability, and natively high flatness. Additionally, they also offer high service temperatures; high thermal shock resistance; and almost zero thermal expansion throughout a moderate temperature range (0-500° C.), making them well-suited for moderate-temperature applications.

In a second preferred embodiment, a silicon carbide material is used as the sealing surface. Silicon carbide offers high thermal stability into the 1000-1500° C. range, making it a good candidate for high temperature applications.

It should be noted that there may be a component with portions of its surface which are sometimes forming a portion of the sealed volume and are therefore on the inside, while at other times those same portions may be exposed to the outside atmosphere. By way of illustrative example, returning to FIG. 1, portions of the lower surface of the sealing plate 1004 satisfy this definition, depending on the relative positions of volume enclosure and the sealing plate 1004. The material of, and finish on this surface should be carefully chosen in order to limit the amount of contaminants which may adsorb onto and then effectively carried into the sealed volume by the relative motion of the enclosure and the sealing plate. For example, if a sufficient quantity of water vapor adsorbed onto a portion of the surface and this portion was then translated into the sealed volume, it could degrade the purity-controlled atmosphere 1002. The sealing plate 1004 itself should be impermeable to the contaminant species of interest, and its surface selected to be a material with minimal porosity, minimal roughness (surface area), and which does not excessively sorb contaminants. Exemplary surfaces include polished metals, many glasses, ceramics, and glass-ceramics. As the Péclet gap seal has a length dimension 1007, contaminants that are present on the surface and which come off the surface as it enters the sealed volume may be swept away by the gas flow in the gap, leaving little to no contamination remaining to be released into the controlled environment inside the sealed volume. Furthermore, maintaining the surface of the sealing plate at a substantially elevated temperature may prevent or inhibit sorption of some species.

In this planar surface seal embodiment shown in FIG. 1, the opposing surfaces used as part of the seal preferably have tightly controlled flatness, on the order of 100 µm, and more preferably on the order of 10 µm or less. The aerostatic seal element may be made from any number of materials, but preferably is made from a material that is highly dimensionally stable throughout the range of temperatures and other operating conditions that the seal will be subjected to. The sealing surface (e.g. the plate 1004 shown in FIG. 1) is similarly manufactured with a tightly controlled flatness at least over the characteristic dimension of the aerostatic seal element; and further, is manufactured from a material with the properties described previously. The aerostatic seal element is then displaced from the sealing surface by some distance, preferably in the range of 50 to 500 microns. This may be accomplished with sliding or rolling elements between the components of the seal. It may be accomplished without contact between the moving components of the seal by fixing the vertical position of the two components of the seal to a combination of the machine frame and the motion system. In this embodiment, a slight elevated gas pressure (on the order of 10-1000 Pa) is developed in the inner, high-purity environment through flow of gas into the inner high-purity environment. This gas pressure causes gas to flow between the aerostatic seal element and the sealing surface, at velocities substantial enough to result suitable Pe numbers. The width of this face may be selected such that in combination with the pressure differential between the interior and exterior of the volume, and the distance between the aerostatic seal element and the sealing surface, flow through the resultant rectangular gaps will tend to favor advective mass transfer over diffusive mass transfer, and keep contaminant species from diffusing back across the boundary into the high-purity environment, per the earlier discussion of the Péclet number. Note that the width of this face corresponds to the sealing length along the flow direction, L, the Péclet seal as described in Eqn.

One skilled in the art can see how a wide range of system architectures can be constructed from utilizing one or more Péclet gap seals with various degrees-of-freedom, depending on the types of relative motion desired, positions of the actuators, and other considerations. By way of example, consider that a planar Péclet gap seal such as the embodiment illustrated in FIG. 4 with two translational degrees-of-freedom may be alternatively be implemented by employing two single translation degrees-of-freedom Péclet gap seals.

A system for which makes use of several aspects of the current disclosure for 3D Printing of aluminum parts using magnetohydrodynamic (MHD) jetting of molten aluminum will now be described with respect to FIGS. 8A-8G. The components of the motion system 807, 809, 840, 841, 807, and 809 and thermal insulation 823 are removed from the inert volume, thereby dramatically reducing its volume. The system has a frame 810 to which are mounted the x-axis motion stage 826 and associate carriage 827, and the z-axis motion stages 807 and associated carriages 809.

The z-axis motion stages move frame 808 and glass-ceramic sealing plate 806 upward on a layer-by-layer basis to print the part. These upward motions generally take place after a layer is complete and before the subsequent layer commences printing. FIG. 8d shows, among other concerns, the vertical position of the sealing plate at the point where the last droplet of the first layer is in flight. FIG. 8E shows, among other concerns, the vertical position of the sealing plate at a point intermediate to printing of a layer somewhere near the vertical center of the complete part. FIG. 8F shows, among other concerns, the vertical position of the sealing plate at as the last droplet is being added to the part.

Figure 8A:
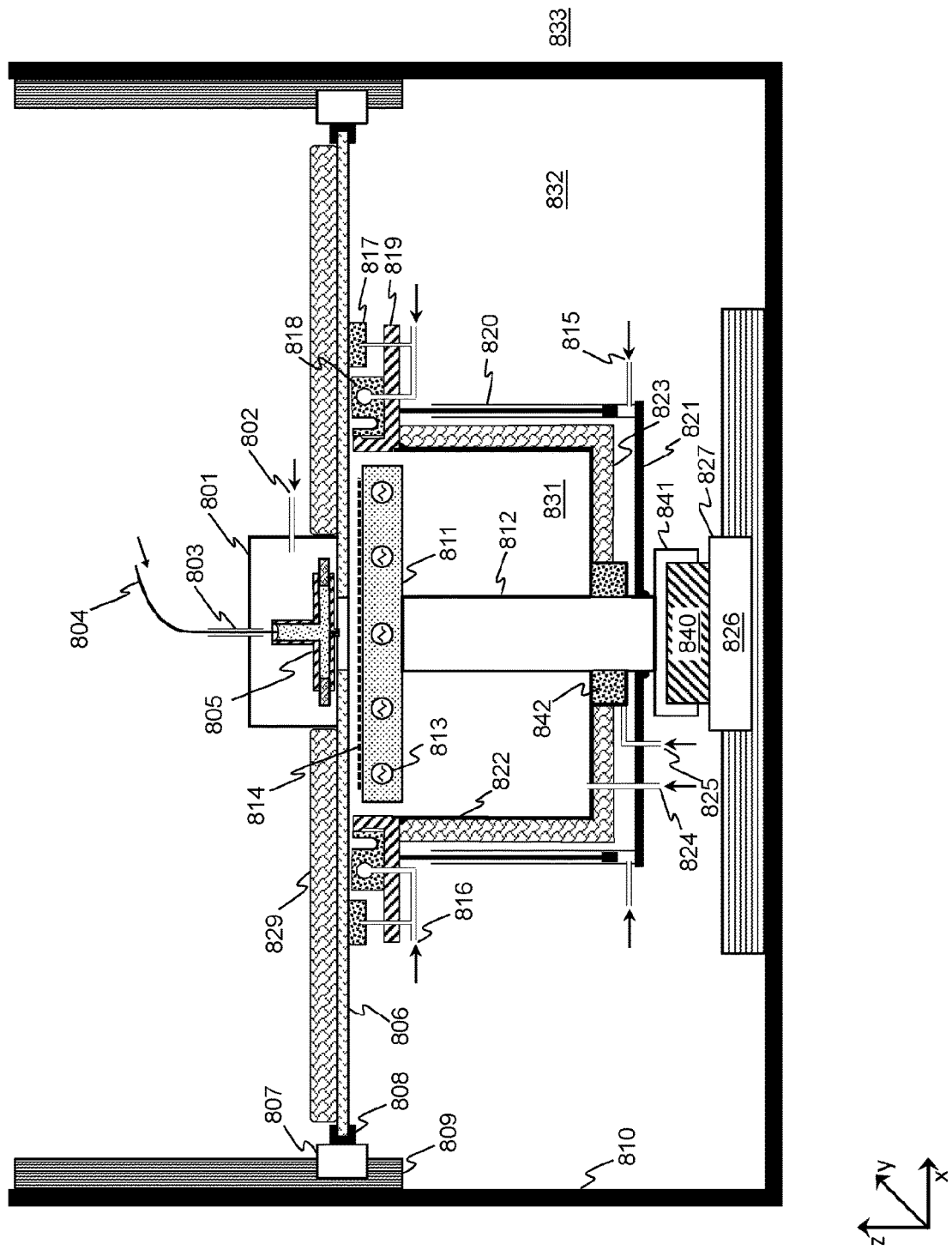
FIG. 8A shows the details of an embodiment of the disclosure for a MHD printing system comprising external load-supporting aerostatic bearings and a two degree-of-freedom Péclet gap seal.
Figure 8B:
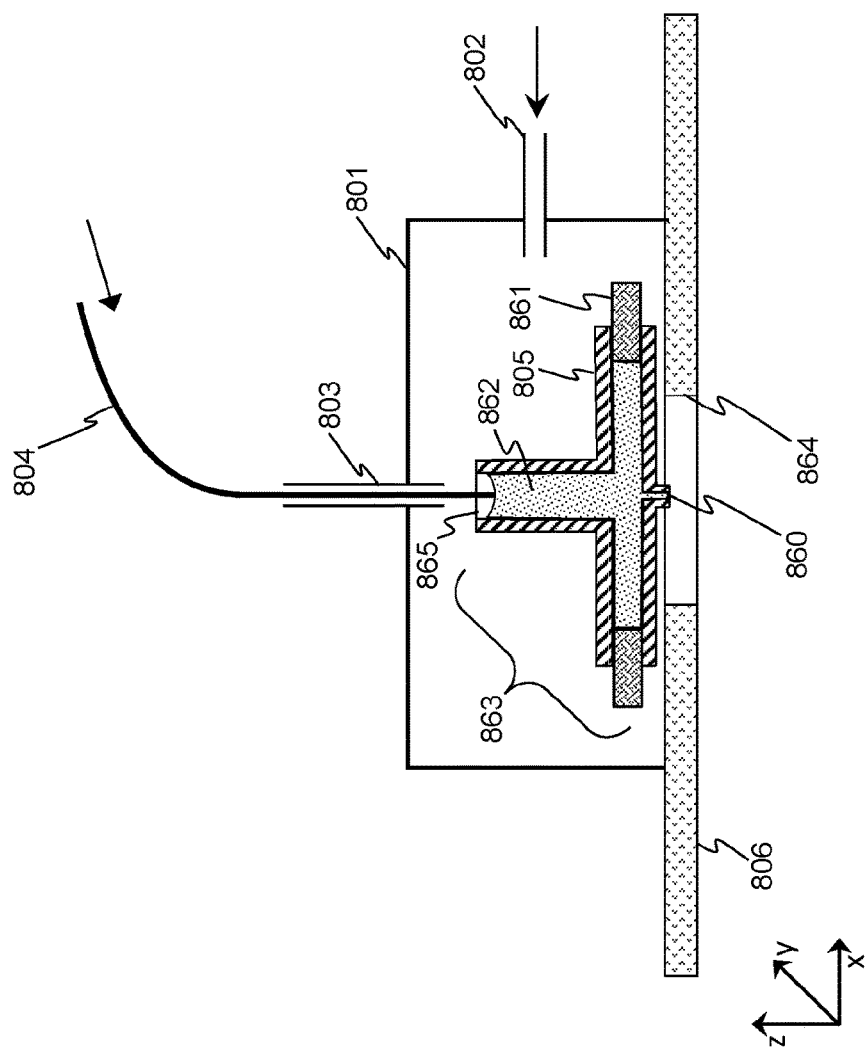
FIG. 8B shows a close-up of the MEM printhead of FIG. 8A.

As may be seen in FIG. 8A and in the detail of FIG. 8B, the printhead 863 in the printhead enclosure 801 moves up and down with the sealing plate 806. Gas, usually inert, is admitted to the printhead enclosure through port 802. Feed wire 804 enters the printhead enclosure through entryway 803. Entryway 803 can be a Péclet seal or another type of seal known in the art. Contained within the printhead enclosure are magnets, not shown, to create the magnetic field required for MHD jetting. Wires, not shown, penetrate through enclosure 801 to communicate current into and out of the MHD printhead thought current feeds 861. The body 805 of the nozzle may typically be ceramic. The body is filled with molten metal 862 which is the result of melting feed wire 804. The body includes a reservoir 865 which contains molten metal into which the wire is melted and serves to buffer the temperature impact of the melting of the wire as well as provide for some material to jet during a momentary cessation of wire feeding, for whatever reason. There are several other elements contained within enclosure 801 including fixtures, brackets and other, not shown. Molten metal exists the body of the nozzle through orifice 860.

Typically, the sealing plate is made of moderately transparent glass-ceramic 5 mm thick. This glass-ceramic may be chosen with a visible-light-transparent, IR-light-reflecting coating, such as indium tin oxide (ITO) which aids in keeping heat in the sealed volume. However, thermal insulation 829 may be added to help keep the sealed volume hot.

The y-axis motion stage is mounted to the carriage of the x-axis motion stage so that together the x-axis and y-axis stages can create arbitrary 2-D motions of the print platform 811 and the part under the printhead 863, which does not traverse in the x-direction or in the y-direction. The nozzle of the printhead may have line-of-sight to the part through a cutout 864 in the sealing plate. A hollow column 812 is attached to carriage 828 of the y-axis. The print platform 811 is attached to the top of the column. The print platform has electrical cartridge heaters 813 disposed within it to heat the build platform, typically to a temperature of 500° C. for printing aluminum alloys. There is a temperature sensor, not shown, which provides the feedback for the system to control the temperature of the print platform. The wires for the temperature measurement and the wires to the heaters 813 travel though the center of the column 812 and through this column to the region outside the sealed volume via conventional feedthroughs seals as known in the art. The majority of the internal volume of the column may be filled with thermal insulation, not shown.

The heat from the build platform is also the source of heat for entire sealed volume 831 so that the atmosphere within the sealed volume is also hot and helps to maintain the part at an elevated temperature. Having the part at an elevated temperature leads to good fusion of incoming molten metal droplets without requiring excessive superheating of the liquid metal in the printhead.

A build sheet 814 is attached to the print platform, typically by vacuum hold-down to the print platform. The vacuum line for the vacuum chuck built into the print platform runs down through the center of the column, not shown. The built sheet is typically a thin metal sheet or foil onto which the first layer of printed material sticks, adheres or welds. The foil can be aluminum, stainless steel or other metals.

The motion of the part in the x-y plane, combined with the motion of the printhead in the vertical direction comprise the 3 axes of motion needed to define a part of arbitrary geometry. The sequence of motion is to execute typically numerous motions in the x-y plane to define a layer and then to increment the z position of sealing plate 806. The next layer of the part is then printed through another sequence of motions in the x-y plane.

The sealing volume 831 is defined by a thin shell or enclosure of impermeable material 822. Typically this can be stainless steel, and, for example, fabricated by laser welding or furnace brazing. This shell is hermetically welded to metal structure 819, which runs the full perimeter defined by the top of shell 822. Gas, usually inert, can be admitted to the sealed volume at port 824. Typical dimensions for the sealed volume are approximately 200 mm and 250 mm in the x and y directions and 150 mm in the z direction, although significantly larger volumes are possible. The perimeter of the sealed volume 831 may be square, rectangular, cylindrical, or any other shape. A rectangular shape is particularly advantageous as it accommodates a rectangular print platform which is lower cost to fabricate than alternatives and generally leads to the ability to build the largest parts. The shell 822 is surrounded by thermal insulation 823 in order to help maintain the sealed volume at and elevated temperature. An example of a suitable insulation material is Pyrogel XTE (Aspen Aerogels, Inc., Northborough, MA), which has excellent insulating properties relative to its mass, which may be an important consideration as the insulation forms part of the moving mass of the system.

Figure 8C:
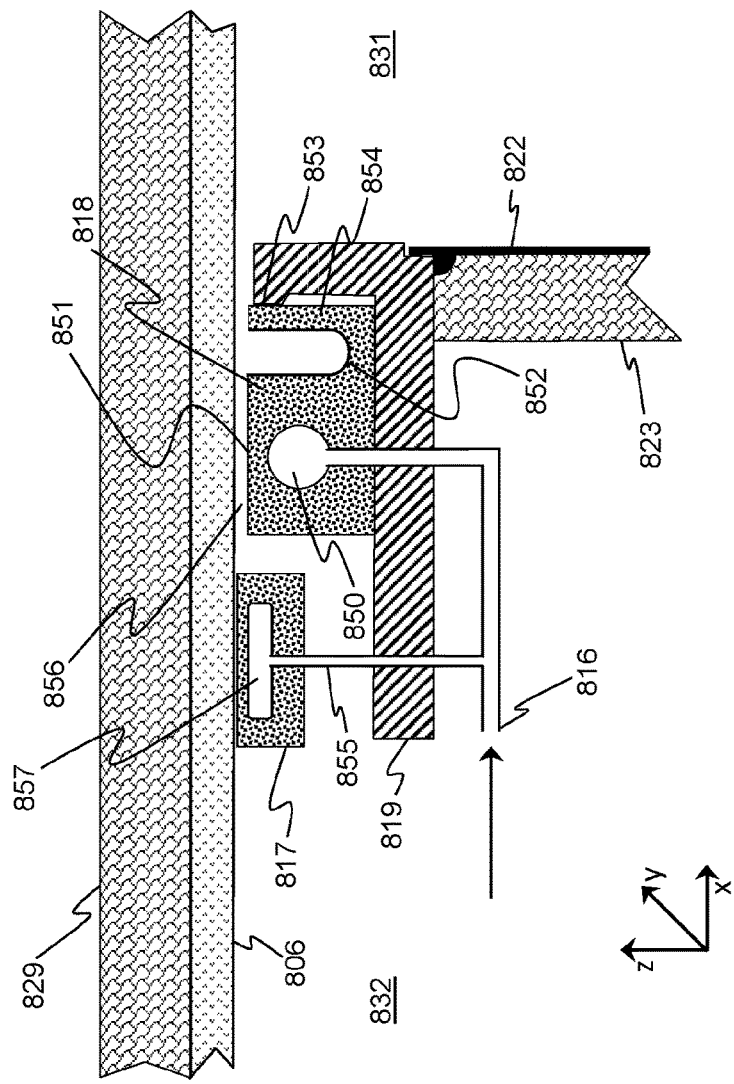
FIG. 8C shows the details of the bearing and seal arrangement of the system of FIG. 8A.
Figure 8D:
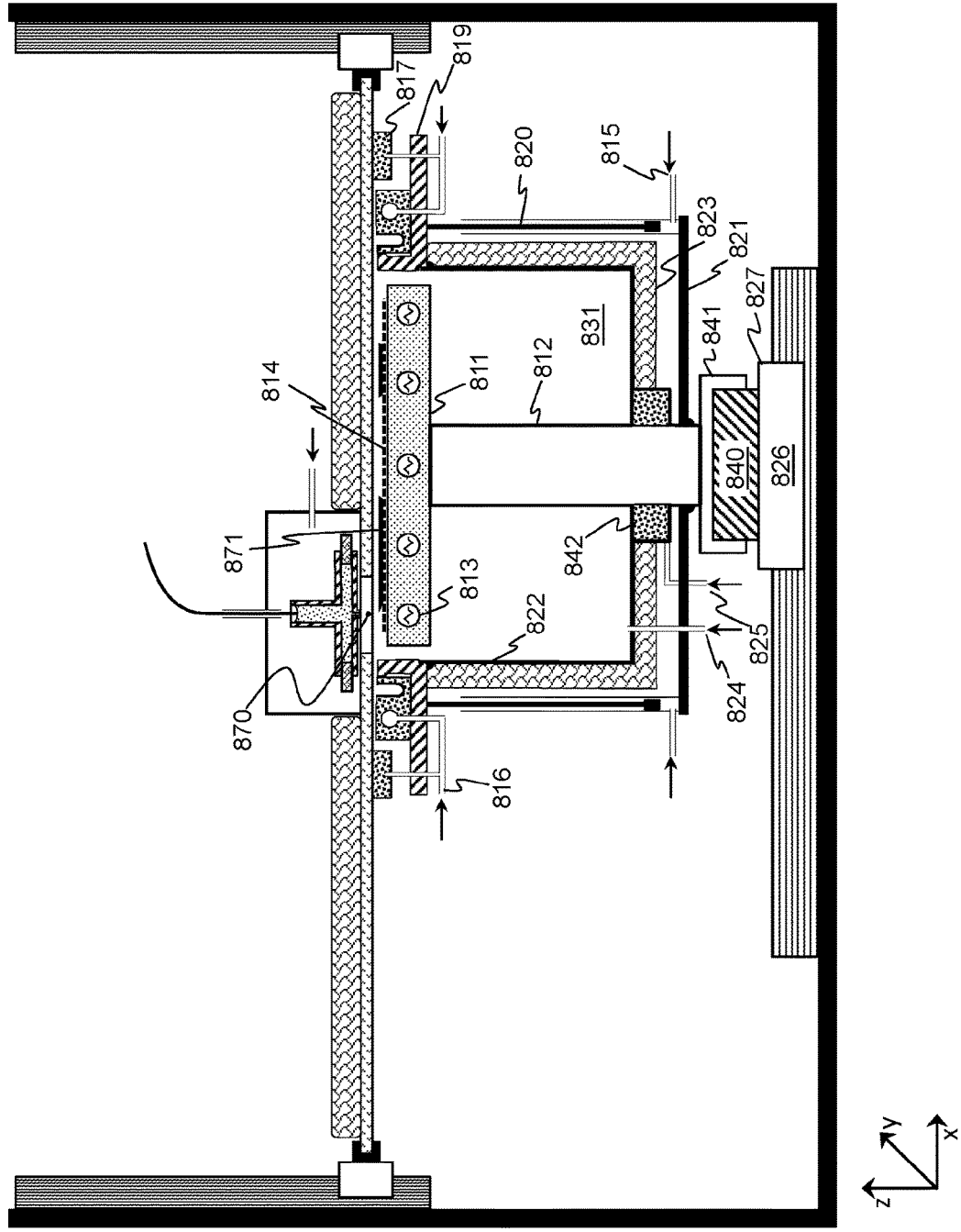
FIGS. 8D-8G shows the embodiment of FIG. 8A in various stages of a printing process.
Figure 8E:
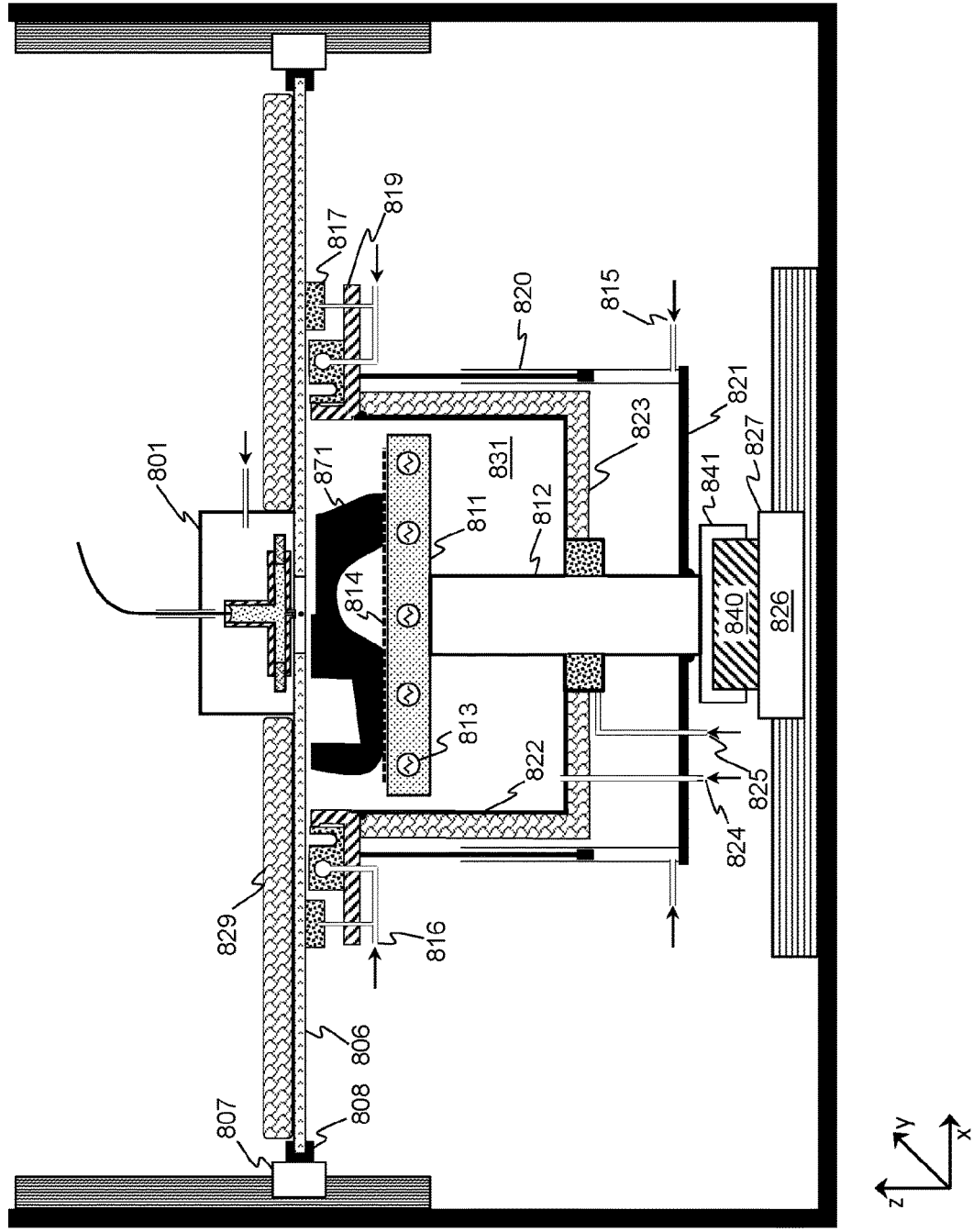
Figure 8F:
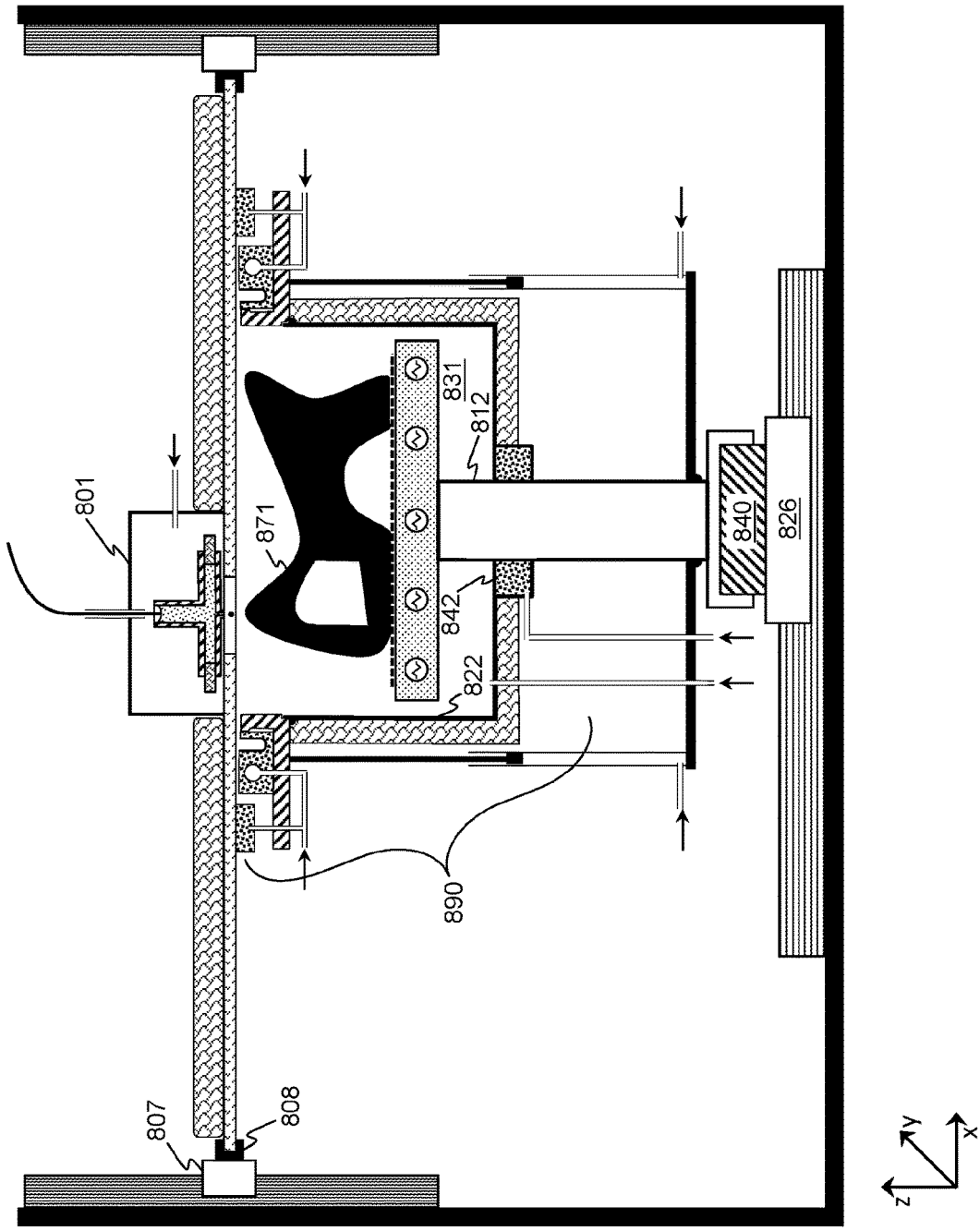

The Péclet gas seal against sealing plate 806 is of the type where gas, typically inert, is expelled from a diffuser, as may be seen in FIG. 8A and in the detail of FIG. 8C. The gas pumped into a cavity 850 within the diffuser 818 where it then flows through the porous medium, existing the diffuser on its upper surface 851 and contributing the gap seal. The distributor element may be made of graphite, for example, with a target permeability in the range of 0.01 to 0.0001 Darcy (9.87e-15 to 9.87e-17 $m^2$). Gas flows into the distributor flows through inlet 816. Inlet 816 is connected via flexible tubing to a gas source within the machine. The tubing must be flexible enough to accommodate the motion in the x-y plane. The distributer element is constrained to the metal structure 819 using machined reference features, tie down clamps, or other mechanical affixation such as bolts. Should operation and service temperatures allow, the use of an adhesive and/or a sealant may be used to bond and seal between these components such as an epoxy or a high temperature RTV silicone. The graphite of the distributor and the stainless steel of the metal structure are chosen to be as closely matched in thermal expansion as possible over the range from room temperature to the elevated operating temperature, which here may approach the temperature of the part in the sealed volume, which is typically around 500° C. An exemplary pair is ACF-10Q (Poco Graphite, Inc., Decatur, TX) for the distributor and a 400-series stainless the metal structure. However, some amount of mismatch remains, even with this choice. This mismatch may be accommodated by the use of a flexural element 852 machined into the graphite. Graphite has a low modulus and high-quality graphite can therefore sustain strains of 1% or more, suitable for the cantilever shown. A 300-series series such as 316L may also be used with careful consideration and design of this cantilevered flexural element. Typical dimensions for this cantilever are a thickness of 1.3 mm and a length (height in FIG. 8A) of 16 mm. The dimensions of the distributor and the metal structure are best chosen so that there is an interference fit at sealing interface 853 at all temperatures from room temperature up to the operating temperature. Typically, the temperature of these elements is somewhat below the temperature of the gas within the sealed volume, but still substantially elevated from room temperature.

The distributor element is maintained with a controlled gap 856 to the sealing plate by air bearings 817. The gap is nominally in the shape of a circumferential ledge around the periphery of the sealed volume, as defined by diffuser upper surface 851 and the sealing plate 806. These bearings may also be made of graphite and have a pressurized inner cavity 857. There are typically three of these air bearing pads disposed around the perimeter of the sealing volume so as to kinematically determine the gap (three points defines a plane). The air bearings typically ride approximately 5 to 10 microns from the sealing plate, and are preloaded against it via air cylinders 820 fed by gas port 815. Preferably, the preload is delivered at or as near as possible to the center of stiffness of the air bearing. In one embodiment, this one air cylinder pre-loader could be used per air bearing. A typical target gap for the distributor to sealing plate is 100 microns. The air bearings are supported on thin tubes 855, typically made of stainless steel hypodermic tubing. This tubing is chosen so that it can elastically bend, thereby allowing for minute adjustment of the angle of the air bearing to take place automatically as the air bearings ride over the not-perfectly-flat sealing plate. Other means of allowing for angular deviations as known in the art may be used such as ball-and-socket joints. Importantly, the plane defined by air bearings 817 should be higher than upper surface of the diffuser 851. This can be accomplished by, for example, adjusting the length of the tube 855 above the metal structure 819.

The gas feed to the air bearing 817 and the distributor 818 is shown as common. When they are common, they would both typically be fed with inert gas. However, these may be fed from different sources. This can be advantageous as the gas into the air bearing can be actual air, leading to a reduction in operating cost of the entire system. Separate supplies also allow independent control of pressure, if required.

The sealed volume 831 is typically maintained to high purity to reduce oxidation and other unfavorable reactions of the printed part and of the molten metal in flight and in temporary residence atop a printed part prior to freezing. Typically, both oxygen and water vapor should be controlled to less than 100 parts per million each and preferably less than that. In addition, if the frame 810 and machine enclosure are reasonably sealed, internal volume 832 will be somewhat cleaner than the air in the surrounding room, 833. This is because the clean gas that discharges from volume 831 enters volume 832 and displaces the air that was in it at the start of a build. This effect may be increased by using inert gas for the air bearings 817, and not air. The improved purity and reduced impurities in volume 832 reduce the demands on the Péclet gap seal by reducing the impurity concentration difference between the inside of the seal and the outside of the seal.

Returning to FIGS. 8D-8F, and beginning with 8D, we see that the print platform, part and much of the machine is displaced rightward from its center position. This image, being a cross-section, only shows motion along the x-axis. It will be appreciated that motion may also be taking place along the y-axis. The last drop of the first layer is being printed while the platform is moving from left to right. Note that the part layer shown in FIG. 8D and the later views of the part in FIGS. 8E and 8F, are meant for illustrative purposes only and do not precisely represent the stair-stepping that is typical of layer by layer fabrication as is known in the art.

The x-y motion in FIGS. 8D-8F begins with motion of the x-axis carriage 826 with respect to the frame 810 and the y-axis carriage with respect to y-axis slide 840. The Print platform 811, build sheet 814 and the part 871 undergo the prescribed motion in the x-y plane because the print platform is mounted to column 812, which in turn, is rigidly mounted to carriage 841.

Seal 842 effects a gas seal between the shell 822 and the column 812. This may be a Péclet gap seal or seals known in the art such as o-ring seals, PTFE seals and other types. If it is a Péclet gap seal, it may be of the type described earlier which combines an air bearing with the Péclet gap and may be fed with typically inert gas through port 825. The seal 842 has a function of providing a seal against ingress into the sealed volume 831 of air from the outside the sealed volume. It also has the function of transmitting lateral force from the column to the shell 822 in order to cause the shell, insulation 823, metal structure 819, distributor 818, and air bearings 817 to move in the x-y plane.

The assembly of the shell 822, insulation 823, structure 819, distributor 818 and air bearings 817 and seal 842 will be referred to as the moving enclosure 890. The x-y motion of the moving enclosure can be effected by the lateral force between seal 842 and column 812, in part because the moving enclosure is low in mass and in part because it rides against the sealing plate on very low friction air bearings. The moving enclosure is actively pushed up against the sealing plate by air cylinders 820. These cylinders maintain an upward force that exceeds the weight of the moving enclosure, but is less than the max load that the air bearings 817 can tolerate without touching the sealing plate. These air cylinders are fed with a controlled pressure through ports 815. The upward force from the air cylinders, balanced by the downward force from the air bearings provides resistance to tipping of the moving enclosure 890. The air cylinders 820 push downward on plate 821 which is affixed to the column, usually by welding. Plate 821 thus moves in the x-y plane together with column 812.

In FIG. 8E, the part is approximately half-way through the build. Many layers have been completed between the positions shown in FIGS. 8D and 8E. The moving enclosure, print platform and part are in in the center position along the x-axis in FIG. 8D. This layer is in process and is approximately half complete with the enclosure and part moving from right to left, as can be seen by the already completed portion of the current layer to the left of the jet. Note that the sealing plate has moved up since FIG. 8E and that, under the action of air pistons 820, the moving enclosure 890 has moved up by the same amount so that the gap between the printhead and the part remains unchanged. The tubes conducting gas from inlets 824 and 825 are shown as longer in FIG. 8E than in FIG. 8E. In fact, these tubes are flexible to accommodate the vertical motion.

Figure 8G:
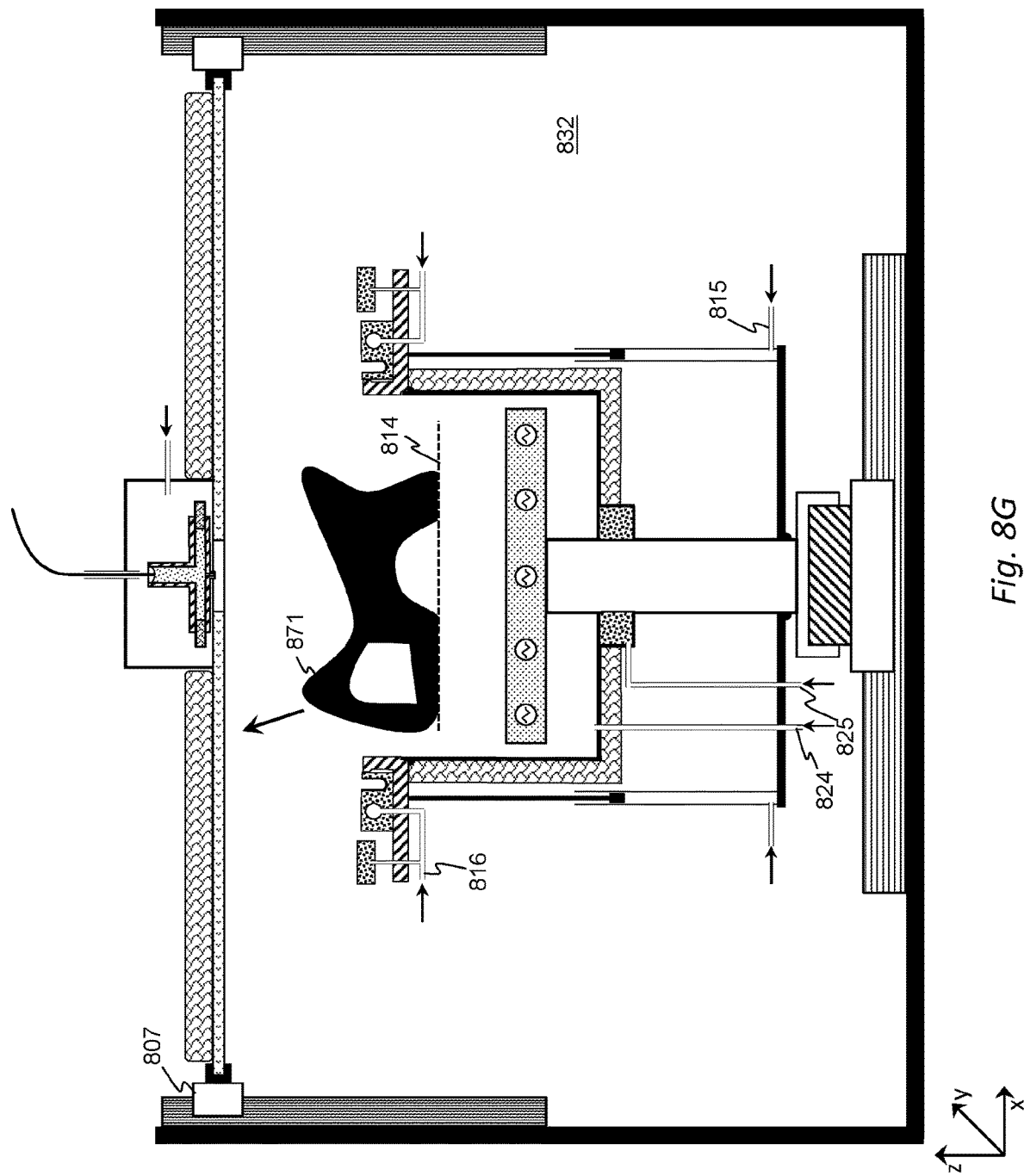

In FIG. 8F, the part is shown as complete, except for the one drop in flight. The sealing plate and moving enclosure have moved further up from the position shown in FIG. 8E. The sealing plate having been moved up by the motion of carriages 807 on slides 809. The moving enclosure 890 has followed due to the upward motion of air cylinders 820. While FIG. 8F shows the moving enclosure and part displaced to the right, as it was in FIG. 8D, it will be appreciated that to print the entire top layer, the moving enclosure and part must also displace to the left of the center position. FIG. 8G shows the sealing plate moved upward from the position it was in at the end of the part. However, the moving enclosure 890 does not move upward due to a reduction in the gas pressure in cylinders 820. This creates an opening through which the part 871 may be retrieved. It will be understood that access to the part can be further enhanced by allowing the moving enclosure to settle downward under its own weight, or pulling it down with the air cylinders. Downward force from the air cylinders may be created by applying vacuum or by using 2-way cylinders which may be forced down with pressure applied near the top of the cylinders as known in the art. Access to the part may be provided by either or both, raising of the sealing late and/or lowering of the moving enclosure.

It is important to stress again the benefit of removing the insulation from the sealed volume. An aspect of the disclosure is that placing the insulation outside the inert volume frees up the type of insulation that can be used. For example, many high temperature insulation materials contain silica, which is well known for absorbing water from its environment. Thus, if a silica bearing insulation is inside the inert volume, it will pick up water when the volume is opened to retrieve the part. It will then give up this water to the inert volume as the inert volume and insulation heat up, thereby contaminating the inert environment. Thus, locating the insulation outside of the inert environment, substantially improves the quality of the controlled inert environment within the sealed volume.

Typical flow rates for such an embodiment with a sealing perimeter of approximately 1 m and a nominal gap of approximately 150 um may be 1.25 SLPM of ultra high purity (UHP) argon (less than 2 ppm oxygen and less than 10 ppm water) admitted to the build volume and 1.25 SLPM of argon admitted to the diffuser. Typical pressures may be 20-100 Pa.

Typical travel speeds of the build volume with respect to the stationary printhead in the x-y plane may be 100 mm/s. Nominal gas velocities may be approximately 300 mm/s over a sealing length of approximately 20 mm around 400° C. mean gas temperature inside the sealed volume, yielding total oxygen and water contaminations levels measured in the 10's of parts per million, including other possible real and virtual leaks into the system.

It will be evident that the embodiment as present here need only utilize gas when Péclet gap seal is required, that is to say possibly during pre-print start-up procedures, during the printing process, and possibly during the post-print shut-down procedures.

Figure 9:
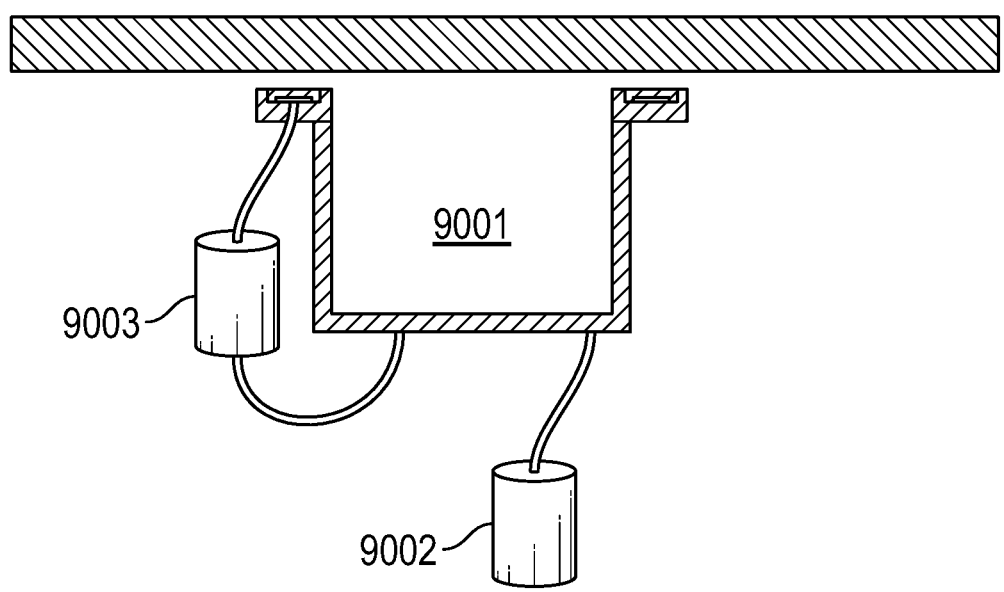
FIG. 9 shows an embodiment which re-uses gas from the sealed volume to feed the distributor.

An embodiment which may reduce total gas consumption is shown in FIG. 9. Here, the Péclet gap seal is operating as a hybrid between flow admitted inside the sealed volume 9001 from a gas supply 9002 and flow admitted through a distributor near the periphery of the seal, as in FIG. 8. Instead of being supplied from a separate or branched supply external to the sealed volume, the distributor's gas is pumped out of the sealed volume via pump 9003, where it may then be pressurized to the requisite pressure, and subsequently admitted to the distributor. Importantly, the pressure inside the sealed volume must remain positive with respect to ambient as otherwise the seal may be compromised. In general, this can be accomplished by feeding the distributor with a fraction of the flow rate of gas that is being admitted into the sealed from the supply 9002. By way of example, if 2 SLPM of argon is being supplied by 1008, then the flow of gas out of the sealed volume, through pump 9003 and into the distributor could be 1 SLPM, leaving 1 SLPM to mix within the sealed volume and be forced through the sealing gap via the pressure differential between inside and outside. In this way, the highest purity gas is first used to dilute any contaminants which may be inside the sealed volume (from leaks or out-gassing, for example), and then a portion of the now slightly contaminated gas may be re-used through the distributor to create the Péclet gap seal. The slightly contaminated gas may only register, for example, in 10s of ppm contaminants, and therefore is still effective in isolating the controlled atmosphere inside from the atmosphere outside. Optionally, this slightly contaminated gas flow may be purified by way of a molecular sieve or other technology known in the art before admitting to the distributor. In this way, this embodiment may reduce the total gas consumption of the system without compromise to the purity of the atmosphere inside the sealed volume with only minimal extra hardware.

Another embodiment to reduce gas consumption would be to alter the amount of gas admitted to gap seal based upon the commanded relative motion of the relevant components. In particular, with reference to planar gap seals, it has been shown that regions of the seal will have surplus velocities while other regions will be penalized due to Couette flow based upon the direction of motion with respect to the direction of flow through the seal. Utilizing enough gas with enough margin to account for the maximum relative velocities between components at all times, for example, even when the components are traveling more slowly or are stationary, can be considered wasteful. A variable pressure or a mass flow controller could be utilized to servo the admission of gas for the gap seal based upon the current relative motion of the components.

An embodiment which relies on engineered compliance in one or more components may alleviate gap dimension variations from non-planarity and/or non-flatness of the sealing components places one or both sealing surfaces are under biaxial tension to assist in maintaining their flatness.

It will be clear to one skilled in the art that the technique described here may be applied in contexts other than additive manufacturing. For example, an automated system that performs a chemical synthesis process which needs to take place in an inert environment could benefit from the use of Péclet gap seal as described herein. The manufacture of semiconductor devices can benefit from both the environmental and the thermal control offered by the disclosures discussed.

What is claimed:

1. A controlled environment system for the additive manufacture of metal objects using magnetohydrodynamic jetting, comprising:
   a sealing plate;
   a volume enclosure including a Péclet gap seal formed by a gap between the sealing plate and the volume enclosure, the gap at least partially defined by a gap dimension and a sealing length, wherein the Péclet gap seal includes a flow of inert gas through the gap from an external gas supply to maintain a high-purity atmosphere in an interior volume of the volume enclosure;
   a print head configured to deliver build material through an opening in the sealing plate; and
   a build platform within the interior volume of the volume enclosure movable relative to the sealing plate.

2. The controlled environment system of claim 1 wherein the Péclet gap seal includes a circumferential ledge parallel to the sealing plate.

3. The controlled environment system of claim 2 wherein the flow of inert gas originates within the interior of the volume enclosure and flows in a gap formed between the sealing plate and the circumferential ledge.

4. The controlled environment system of claim 2 wherein the Péclet gap seal includes an aerostatic element expelling the inert gas.

5. The controlled environment system of claim 4 wherein the aerostatic element includes a distributor formed from a porous media.

6. The controlled environment system of claim 5 wherein the expelling of the inert gas and a flow of inert gas from the volume enclosure together contribute to the flow of inert gas through the Péclet gap seal.

7. The controlled environment system of claim 5 wherein the Péclet gap seal is maintained by three primary contact pads providing a bearing between the volume enclosure and the sealing plate.

8. The controlled environmental system of claim 7 wherein the distributor is recessed from the sealing plate relative to the primary contact pads.

9. The controlled environmental system of claim 8 wherein the distributor is recessed from the sealing plate relative to the primary contact pads by a distance between and inclusive of 50 to 500 microns.

10. The controlled environment system of claim 1 wherein the build platform is movable relative to a print head via a shaft sealed with a Péclet gap seal between the shaft and the volume enclosure.

11. The controlled environment system of claim 10 further comprising a motion system disposed outside of the volume enclosure and configured to move the build platform relative to the print head.

12. The controlled environment system of claim 1 further comprising an amount of thermal insulation disposed on an exterior of the volume enclosure.

13. A method of controlling an environment for the additive manufacture of metal objects using magnetohydrodynamic jetting, comprising:
   providing a sealing plate;
   disposing a Péclet gap seal formed by a gap between the sealing plate and a volume enclosure, the gap at least partially defined by a gap dimension and a sealing length;
   flowing an inert gas at the Péclet gap seal to maintain a high-purity atmosphere in an interior volume of the volume enclosure;
   moving a build platform relative to the sealing plate within the interior volume of the volume enclosure; and
   delivering a build material to the build plate through an opening in the sealing plate.

14. The method of claim 13 wherein the Péclet gap seal includes a circumferential ledge parallel to the sealing plate.

15. The method of claim 14 wherein the flow of inert gas originates within the interior of the volume enclosure and flows in a gap formed between the sealing plate and the circumferential ledge.

16. The method of claim 14 wherein the Péclet gap seal includes an aerostatic element expelling the inert gas.

17. The method of claim 16 wherein the aerostatic element includes a distributor formed from a porous media.

18. The method of claim 17 wherein the expelling of the inert gas and a flow of inert gas from the volume enclosure together contribute to the flow of inert gas through the Péclet gap seal.

19. The method of claim 17 wherein the Péclet gap seal is maintained by at least three primary contact pads providing a bearing between the volume enclosure and the sealing plate.

20. The method of claim 19 wherein the distributor is recessed from the sealing plate relative to the primary contact pads.

21. The method of claim 20 wherein the distributor is recessed from the sealing plate relative to the primary contact pads by a distance between and inclusive of 50 to 500 microns.

22. The method of claim 13 wherein the build platform is movable relative to a print head via a shaft sealed with a Péclet gap seal between the shaft and the volume enclosure.

23. The method of claim 22 further comprising the step of operating a motion system disposed outside of the volume enclosure to move the build platform relative to the print head.

24. The method of claim 13 wherein the volume enclosure has disposed on an exterior an amount of thermal insulation.

* * * * *